(12) United States Patent
Lee et al.

(10) Patent No.: US 9,800,872 B2
(45) Date of Patent: Oct. 24, 2017

(54) METHOD AND APPARATUS FOR ENCODING VIDEO BY USING BLOCK MERGING, AND METHOD AND APPARATUS FOR DECODING VIDEO BY USING BLOCK MERGING

(71) Applicant: SAMSUNG ELECTRONICS CO., LTD., Suwon-si (KR)

(72) Inventors: Tammy Lee, Seoul (KR); Woo-jin Han, Suwon-si (KR); Il-koo Kim, Osan-si (KR); Sun-il Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 691 days.

(21) Appl. No.: 14/299,897

(22) Filed: Jun. 9, 2014

(65) Prior Publication Data

US 2014/0286395 A1 Sep. 25, 2014

Related U.S. Application Data

(63) Continuation of application No. 13/178,862, filed on Jul. 8, 2011, now Pat. No. 8,885,727.
(Continued)

(30) Foreign Application Priority Data

Jan. 21, 2011 (KR) .................... 10-2011-0006486

(51) Int. Cl.
*H04N 19/105* (2014.01)
*H04N 19/137* (2014.01)
(Continued)

(52) U.S. Cl.
CPC ......... *H04N 19/137* (2014.11); *H04N 19/103* (2014.11); *H04N 19/105* (2014.11);
(Continued)

(58) Field of Classification Search
CPC .. H04N 19/137; H04N 19/103; H04N 19/105; H04N 19/139; H04N 19/14;
(Continued)

(56) References Cited

U.S. PATENT DOCUMENTS

| | | |
|---|---|---|
| 5,608,458 A | 3/1997 | Chen et al. |
| 6,043,846 A | 3/2000 | Shen et al. |

(Continued)

FOREIGN PATENT DOCUMENTS

| | | |
|---|---|---|
| CA | 2804780 A1 | 1/2012 |
| CN | 101617538 A | 12/2009 |

(Continued)

OTHER PUBLICATIONS

Communication dated Dec. 4, 2014, issued by the Australian Intellectual Property Office in counterpart Australian Application No. 2011274722.
(Continued)

*Primary Examiner* — Tung Vo
*Assistant Examiner* — Joseph Becker
(74) *Attorney, Agent, or Firm* — Sughrue Mion, PLLC

(57) ABSTRACT

Provided are a method and apparatus for encoding a video by using block merging and a method and apparatus for decoding a video by using block merging. The method of encoding includes: determining an encoding mode indicating a current data unit for encoding of a picture and an encoding method including prediction encoding performed for the current data unit; determining an occurrence of merging with at least one neighboring data unit based on at least one of the encoding mode and a prediction mode; and determining prediction mode information, merging related information, and prediction related information, and determining encoding information of the data unit including the
(Continued)

prediction mode information, the merging related information, and the prediction related information.

2 Claims, 25 Drawing Sheets

Related U.S. Application Data

(60) Provisional application No. 61/367,952, filed on Jul. 27, 2010, provisional application No. 61/362,829, filed on Jul. 9, 2010.

(51) Int. Cl.
| | |
|---|---|
| *H04N 19/56* | (2014.01) |
| *H04N 19/52* | (2014.01) |
| *H04N 19/159* | (2014.01) |
| *H04N 19/176* | (2014.01) |
| *H04N 19/70* | (2014.01) |
| *H04N 19/196* | (2014.01) |
| *H04N 19/96* | (2014.01) |
| *H04N 19/103* | (2014.01) |
| *H04N 19/463* | (2014.01) |
| *H04N 19/14* | (2014.01) |
| *H04N 19/174* | (2014.01) |
| *H04N 19/139* | (2014.01) |
| *H04N 19/30* | (2014.01) |
| *H04N 19/33* | (2014.01) |

(52) U.S. Cl.
CPC ........... *H04N 19/139* (2014.11); *H04N 19/14* (2014.11); *H04N 19/159* (2014.11); *H04N 19/174* (2014.11); *H04N 19/176* (2014.11); *H04N 19/196* (2014.11); *H04N 19/30* (2014.11); *H04N 19/33* (2014.11); *H04N 19/463* (2014.11); *H04N 19/52* (2014.11); *H04N 19/56* (2014.11); *H04N 19/70* (2014.11); *H04N 19/96* (2014.11)

(58) Field of Classification Search
CPC .. H04N 19/159; H04N 19/174; H04N 19/176; H04N 19/196; H04N 19/30; H04N 19/33; H04N 19/463; H04N 19/52; H04N 19/56; H04N 19/70; H04N 19/96
USPC .................................................. 375/240.02
See application file for complete search history.

(56) References Cited

U.S. PATENT DOCUMENTS

| | | | |
|---|---|---|---|
| 6,314,209 | B1 | 11/2001 | Kweon et al. |
| 8,472,522 | B2 | 6/2013 | Matsuo et al. |
| 8,750,377 | B2 | 6/2014 | Divorra Escoda et al. |
| 8,879,626 | B2 | 11/2014 | Alshina et al. |
| 8,923,399 | B2 | 12/2014 | Yang |
| 9,083,980 | B2 | 7/2015 | Kondo et al. |
| 2007/0171969 | A1 | 7/2007 | Han et al. |
| 2008/0043843 | A1* | 2/2008 | Nakaishi ............. H04N 19/176 375/240.16 |
| 2008/0165855 | A1 | 7/2008 | Wang et al. |
| 2008/0317132 | A1 | 12/2008 | Zhou et al. |
| 2010/0124273 | A1 | 5/2010 | Divorra Escoda et al. |
| 2010/0135387 | A1* | 6/2010 | Divorra Escoda ... H04N 19/159 375/240.12 |
| 2010/0220790 | A1 | 9/2010 | Jeon et al. |
| 2013/0034171 | A1 | 2/2013 | Winken et al. |
| 2013/0107959 | A1 | 5/2013 | Park et al. |
| 2014/0177723 | A1 | 6/2014 | Shiodera et al. |
| 2014/0294082 | A1 | 10/2014 | Lee et al. |
| 2015/0030077 | A1 | 1/2015 | Jeon et al. |

FOREIGN PATENT DOCUMENTS

| | | |
|---|---|---|
| CN | 101647279 A | 2/2010 |
| CN | 101682763 A | 3/2010 |
| CN | 101682769 A | 3/2010 |
| EP | 2924995 A1 | 9/2015 |
| JP | 2004208259 A | 7/2004 |
| JP | 2009-239852 A | 10/2009 |
| JP | 2015100136 A | 5/2015 |
| JP | 2015136146 A | 7/2015 |
| KR | 19980013418 A | 4/1998 |
| KR | 10-2009-0033847 A | 4/2009 |
| KR | 10-2009-0110336 A | 10/2009 |
| RU | 2204217 C2 | 5/2003 |
| RU | 2355126 C2 | 5/2009 |
| WO | 98/27741 A1 | 6/1998 |
| WO | 2008127597 A2 | 10/2008 |
| WO | 2008156548 A1 | 12/2008 |
| WO | 2009051419 A2 | 4/2009 |
| WO | 2010/002214 A3 | 1/2010 |
| WO | 2011125211 A1 | 10/2011 |
| WO | 2011125256 A1 | 10/2011 |
| WO | 2011128366 A1 | 10/2011 |
| WO | 2012/005520 A3 | 1/2012 |

OTHER PUBLICATIONS

Communication dated Mar. 13, 2015, issued by the Korean Intellectual Property Office in counterpart Korean Application No. 2014-0054390.
Communication dated Mar. 13, 2015, issued by the Korean Intellectual Property Office in counterpart Korean Application No. 2014-0097620.
Communication dated Mar. 13, 2015, issued by the Korean Intellectual Property Office in counterpart Korean Application No. 2014-0097621.
Communication dated May 8, 2015, issued by the European Patent Office in counterpart European Application No. 11803806.6.
Communication dated May 8, 2015, issued by the European Patent Office in counterpart European Application No. 14193556.9.
Communication dated May 8, 2015, issued by the European Patent Office in counterpart European Application No. 15154330.3.
Communication dated May 6, 2015, issued by the Canadian Intellectual Property Office in counterpart Canadian Application No. 2886960.
Communication dated May 6, 2015, issued by the Canadian Intellectual Property Office in counterpart Canadian Application No. 2886964.
Communication dated May 6, 2015, issued by the Canadian Intellectual Property Office in counterpart Canadian Application No. 2886724.
Communication dated May 22, 2015, issued by the State Intellectual Property Office of P.R. China in counterpart Chinese Application No. 201180043660.2.
Davies (BBC) T et al., "Suggestion for a Test Model", 1. JCT-VC Meeting; Apr. 15, 2010-Apr. 23, 2010; Dresden; Joint collaborative Team on Video Coding of ISO/IEC JTC1/SC29/WG11 and 1TU-TSG. 16; URL: http://WFTP3.ITU.INT/AV-ARCH/JCTVC-SITE/,, May 7, 2010, 30 pages total, XP 030007526.
McCann (Zetacast / Samsung) K et al., "Samsung and BBC response to Call for Proposals on Video Compression Technology", 1. JCT-VC Meeting; Apr. 15, 2010-Apr. 23, 2010; Dresden; Joint collaborative Team on Video Coding of ISO/IEC JTC1/SC29/ WG11 and 1TU-TSG. 16; URL: http://WFTP3.ITU.INT/AV-ARCH/JCTVC-SITE/,, No. JCTVC-A124, Jun. 1, 2010, 36 pages total, XP 030007573.
I-K Kim et al., "TE11: Report on Experiment 3.2.c: Check Skip and Merge Together", 3. JCT-VC Meeting; 94. MPEG Meeting; Oct. 7, 2010-Oct. 15, 2010; Guangzhou; Joint Collaborative Team on Video Coding of ISO/IEC JTC1/SC29/WG11 and 1TU-TSG. 16; URL: http://WFTP3.ITU.INT/AV-ARCH/JCTVC-SITE/,, No. JCTVC-C199, Oct. 2, 2010, 3 pages total, XP 030007906.

(56) References Cited

OTHER PUBLICATIONS

De Forni R et al., "On the Benefits of Leaf Merging in Quad-Tree Motion Models", Image Processing, 2005. IEEE International Conference on, vol. 2, Sep. 11, 2005, pp. 858-861, XP 010851189.
McCann (Zetacast / Samsung) K et al., "Samsung's Response to the Call for Proposals on Video Compression Technology", 1. JCT-VC Meeting; Apr. 15, 2010-Apr. 23, 2010; Dresden; Joint collaborative Team on Video Coding of ISO/IEC JTC1/SC29/WG11 and 1TU-TSG. 16; URL: http://WFTP3.ITU.INT/AV-ARCH/JCTVC-SITE/,, Apr. 16, 2010, 42 pages total, XP 030007574.
Communication dated Sep. 2, 2015 issued by European Patent Office in counterpart European Patent Application No. 15166149.3.
Anonymous, "Test Model under Consideration", Joint Collaborative Team on Video Coding (JCT-VC) of ITU-T SG16 WP3 and ISO/IEC JTC1/SC29/WG11, Jul. 21-28, 2010, 152 pages total, 2nd Meeting, JCT-VC, Geneva, CH, JCTVC-B205.
Wiegand et al., "Overview of the H.264/AVC Video Coding Standard", IEEE Transactions on Circuits and Systems for Video Technology, Jul. 7, 2003, 17 pages total, vol. 13 No. 7.
Communication dated Sep. 16, 2015 issued by Canadian Intellectual Property Office in counterpart Canadian Patent Application No. 2,886,964.
Communication dated Sep. 16, 2015 issued by Canadian Intellectual Property Office in counterpart Canadian Patent Application No. 2,886,960.
Communication dated Oct. 2, 2015 issued by Canadian Intellectual Property Office in counterpart Canadian Patent Application No. 2,886,721.
Communication dated Sep. 30, 2015 issued by Canadian Intellectual Property Office in counterpart Canadian Patent Application No. 2,804,780.
Communication dated Oct. 20, 2015 issued by Russian Intellectual Property Office in counterpart Russian Patent Application No. 2015117980.
Communication dated Oct. 20, 2015 issued by Russian Intellectual Property Office in counterpart Russian Patent Application No. 2015117985.
Communication dated Oct. 20, 2015 issued by Russian Intellectual Property Office in counterpart Russian Patent Application No. 2015118007.
Communication dated Oct. 20, 2015 issued by Russian Intellectual Property Office in counterpart Russian Patent Application No. 2015117936.
Communication dated Aug. 26, 2014 issued by the Japanese Patent Office in counterpart Japanese Application No. 2013-519569.
"Test Model under Consideration", Joint Collaborative Team on Video Coding (JCT-VC) of ITU-T SG16 WP3 and ISO/IEC JTC1/SC29/WG11, 1st Meeting: Dresden, DE Apr. 15-23, 2010, JCTVC-A205, pp. 1-39E.
Takeshi Chujoh et al., "Description of video coding technology proposal by Toshiba", Joint Collaborative Team on Video Coding (JCT-VC)of ITU-T SG16 WP3 and ISO/IEC JTC1/SC29/WG11,1st Meeting: Dresden, DE Apr. 15-23, 2010, JCTVC-A117r1, pp. 1-7/E.
Joel Jung et al., "Competition-Based Scheme for Motion Vector Selection and Coding", Video Coding Experts Group, 29th Meeting: Klagenfurt, Austria, Jul. 17-18, 2008, VCEG-AC06, pp. 1-8E.
Communication dated Oct. 27, 2014 issued by the Canadian Intellectual Property Office in counterpart Canadian Application No. 2,804,780.
Communication dated Oct. 31, 2014 issued by the Intellectual Property Corporation of Malaysia in counterpart Malaysian Application No. PI2013000069.
Communication issued May 5, 2016, issued by the State Intellectual Property Office of the People's Republic of China in counterpart Chinese Patent Application No. 201510204900.2.
Communication dated Nov. 3, 2016, issued by the State Intellectual Property Office of P.R. China in counterpart Chinese Application No. 201510204802.9.
Communication dated Nov. 23, 2016, issued by the State Intellectual Property Office of P.R. China in counterpart Chinese Application No. 201510203206.9.
Communication issued in corresponding Australian Patent Application No. 2011274722 on Nov. 5, 2013.
Communication issued in corresponding International Patent Application No. PCT/KR2011/004969 on Feb. 24, 2012.
M. Winken et al., "Video Coding Technology Proposal", JCTVC-A116, Fraunhofer, Heinrich Hertz Institute, 28 pages.
Communication dated Dec. 15, 2015, issued by the Japanese Patent Office in counterpart Japanese Application No. 2015-037276.
Communication dated Dec. 15, 2015, issued by the Japanese Patent Office in counterpart Japanese Application No. 2015-037275.
Communication dated Dec. 29, 2015, issued by the State Intellectual Property Office of P.R. China in counterpart Chinese Application No. 201180043660.2.
Martin Winken et al."Description of video coding technology proposal by Fraunhofer HHI",Joint Collaborative Team on Video Coding (JCT-VC) of ITU-T SG16 WP3 and ISO/IEC JTC1/SC29/WG11,1$^{st}$ Meeting: Dresden, DE, Apr. 15-23, 2010 ,JCTVC-A116, 11 pages total.
Ken McCann et al.,"Samsung's Response to the Call for Proposals on Video Compression Technology",Joint Collaborative Team on Video Coding (JCT-VC) of ITU-T SG16 WP3 and ISO/IEC JTC1/SC29/WG11,1$^{st}$ Meeting: Dresden, DE,Apr. 15-23, 2010 ,JCTVC-A124, 16 pages total.
Communication dated Jun. 21, 2017 by the State Intellectual Property Office of P.R. China in counterpart Chinese Patent Application No. 201510204652.1.

* cited by examiner

FIG. 25
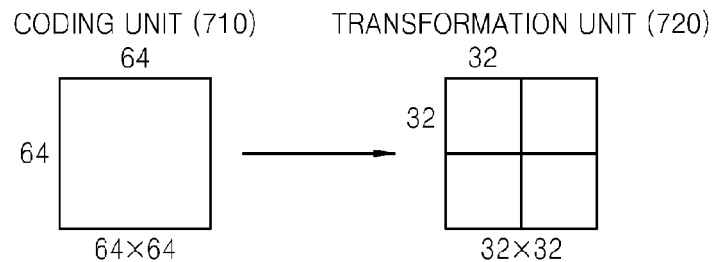
FIG. 26
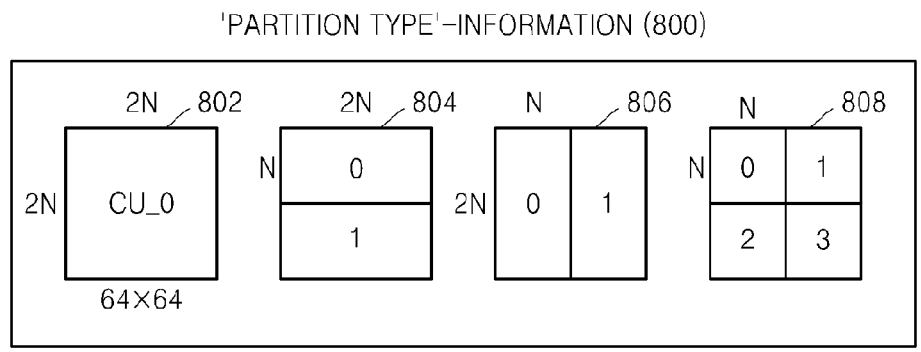
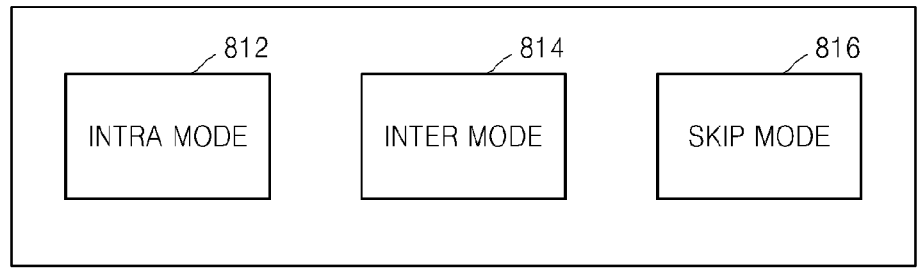
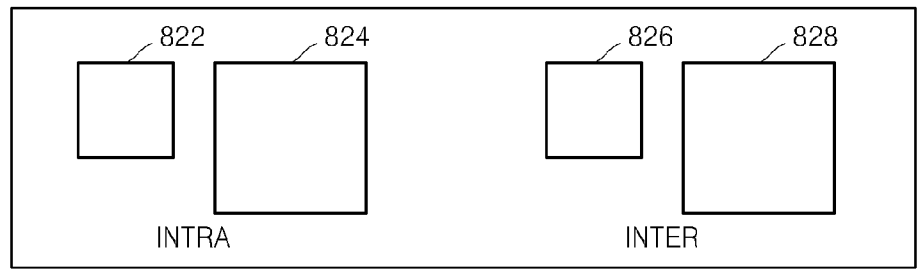

CODING UNITS (1010)

METHOD AND APPARATUS FOR ENCODING VIDEO BY USING BLOCK MERGING, AND METHOD AND APPARATUS FOR DECODING VIDEO BY USING BLOCK MERGING

CROSS-REFERENCE TO RELATED PATENT APPLICATIONS

This is a Continuation Application of U.S. application Ser. No. 13/178,862 filed Jul. 8, 2011, which claims the benefit of U.S. Provisional Patent Application Nos. 61/362,829, filed on Jul. 9, 2010, and 61/367,952, filed on Jul. 27, 2010, and claims priority from Korean Patent Application No. 10-2011-0006486, filed on Jan. 21, 2011 in the Korean Intellectual Property Office, the disclosures of which are incorporated herein in their entireties by reference.

BACKGROUND

1. Field

Apparatuses and methods consistent with exemplary embodiments relate to encoding and decoding of a video by using block merging for prediction encoding.

2. Description of the Related Art

In order to encode blocks in a current image, video compression technologies generally use a motion estimation/compensation method that uses prediction information of a most similar block from among neighboring blocks, and a compression method that reduces a size of video data by removing redundant data by encoding a differential signal between a previous image and a current image through a discrete cosine transform (DCT).

As hardware for reproducing and storing high resolution or high quality video content has been developed and supplied, a demand for a video codec for effectively encoding or decoding the high resolution or high quality video content has increased. In a related art video codec, a video is encoded according to a limited encoding method based on a macroblock having a predetermined size. Also, the related art video codec encodes and decodes video data by performing transformation and inverse transformation on macroblocks by using blocks each having the same size.

SUMMARY

According to an aspect of an exemplary embodiment, there is provided a method of encoding a video by using data unit merging, the method including: determining an encoding mode indicating a data unit for encoding of a picture and an encoding method including prediction encoding that is performed for each data unit; determining an occurrence of merging with at least one neighboring data unit based on at least one of a prediction mode and the encoding mode according to the data units; and determining prediction mode information, merging related information, and prediction related information based on the occurrence of merging with the at least one neighboring data unit according to the data units and determining encoding information of the data unit including the prediction mode information, the merging related information, and the prediction related information.

The determining of the encoding information may include: determining skip mode information indicating whether a prediction mode of the data unit is a skip model and determining whether merging information indicating whether the data unit and the at least one neighboring data unit are merged with each other is encoded based on the skip mode information.

According to an aspect of another exemplary embodiment, there is provided a method of decoding a video by using data unit merging, the method including: parsing a received bitstream to extract encoded video data and encoding information and extract prediction mode information, merging related information, and prediction related information in the encoding information; and analyzing an occurrence of merging with at least one neighboring data unit based on at least one of a prediction mode and an encoding mode according to data units based on the prediction mode information and the merging related information, and performing inter prediction and motion compensation by using prediction related information of the at least one neighboring data unit on a data unit merged with the at least one neighboring data unit, to decode the encoded video data according to the data units determined based on the encoding information.

The extracting and reading may include: extracting and reading skip mode information indicating whether a prediction mode of the data unit is a skip mode; and determining whether merging information indicating whether the data unit and the at least one neighboring data unit are merged with each other is extracted based on the skip mode information.

According to an aspect of another exemplary embodiment, there is provided an apparatus for encoding a video by using data unit merging, the apparatus including: an encoding mode determiner which determines an encoding mode indicating a data unit for encoding a picture and an encoding method including prediction encoding for each data unit; a data unit merging determiner which determines an occurrence of merging with at least one neighboring data unit based on at least one of a prediction mode and the encoding mode according to the data units; and an encoding information determiner which determines prediction mode information, merging related information, and prediction related information based on the occurrence of merging with the neighboring data unit according to the data units and determines encoding information of the data unit including the prediction mode information, the merging related information, and the prediction related information.

According to an aspect of another exemplary embodiment, there is provided an apparatus for decoding a video by using data unit merging, the apparatus including: a parser and extractor which parses a received bitstream to extract encoded video data and encoding information and to extract prediction mode information, merging related information, and prediction related information in the encoding information; and a data unit merger and decoder which analyzes an occurrence of merging with at least one neighboring data unit based on at least one of a prediction mode and an encoding mode according to data units based on the prediction mode information and the merging related information and performs inter prediction and motion compensation by using prediction related information of the at least one neighboring data unit on a data unit merged with the neighboring data unit, to decode the encoded video data according to the data units determined based on the encoding information.

According to an aspect of another exemplary embodiment, there is provided a computer-readable recording medium having embodied thereon a program for executing the method of encoding the video.

According to an aspect of another exemplary embodiment, there is provided a computer-readable recording medium having embodied thereon a program for executing the method of decoding the video.

BRIEF DESCRIPTION OF THE DRAWINGS

The above and other features and advantages will become more apparent by describing in detail exemplary embodiments with reference to the attached drawings in which:

FIG. 25 is a diagram for explaining a relationship between a coding unit and transformation units, according to an exemplary embodiment;

FIG. 26 is a diagram for explaining encoding information of coding units corresponding to a coded depth, according to an exemplary embodiment;

DETAILED DESCRIPTION OF EXEMPLARY EMBODIMENTS

Hereinafter, 'an image' may refer to not only a still image but also a moving image such as a video. Furthermore, 'a data unit' refers to a group of data in a predetermined range from among data constituting a video. Also, hereinafter, expressions such as "at least one of," when preceding a list of elements, modify the entire list of elements and do not modify the individual elements of the list.

Encoding and decoding of a video using data unit merging, according to one or more exemplary embodiments, will be explained below with reference to FIGS. 1 through 18. Encoding and decoding of a video using data unit merging based on coding units having a tree structure, according to one or more exemplary embodiments, will be explained below with reference to FIGS. 19 through 33.

An apparatus for encoding a video, an apparatus for decoding a video, a method of encoding a video, and a method of decoding a video, by using data unit merging, according to one or more exemplary embodiments, will be explained below with reference to FIGS. 1 through 18.

Figure 1:
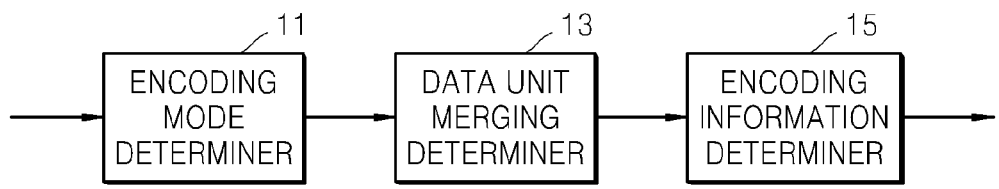
FIG. 1 is a block diagram of an apparatus for encoding a video by using data unit merging, according to an exemplary embodiment.

FIG. 1 is a block diagram of an apparatus 10 for encoding a video by using data unit merging, according to an exemplary embodiment.

The apparatus 10 includes an encoding mode determiner 11, a data unit merging determiner 13, and an encoding information determiner 15. For convenience of explanation, the apparatus 10 for encoding a video by using data unit merging is referred to as an apparatus 10 for encoding a video.

The apparatus 10 receives video data, encodes the video data by performing inter prediction between pictures, intra prediction in a picture, transformation, quantization, and entropy encoding for pictures of the video, and outputs encoding information including information about encoded video data and an encoding mode.

The encoding mode determiner 11 may determine a data unit for encoding of a picture and may determine an encoding method to be performed for each data unit. In a video compression encoding method, in order to reduce a size of data by removing a redundant part in video data, a prediction encoding method using neighboring data is performed. The encoding mode determiner 11 may determine a regular square block or a partition in a regular square block as a data unit for prediction encoding.

The encoding mode determiner 11 may determine a prediction mode indicating a prediction encoding method such as an inter mode, an intra mode, a skip mode, or a direct mode, for each data unit. Also, the encoding mode determiner 11 may determine additional items such as a prediction direction or a reference index useful for prediction encoding according to the prediction mode of the data unit.

The encoding mode determiner 11 may determine various encoding modes including the prediction mode for prediction encoding and related additional items, and may accordingly encode the video data.

The data unit merging determiner 13 may determine whether not only a data unit whose prediction mode is an inter mode but also a data unit whose prediction mode is a skip mode or a direct mode from among data units determined by the encoding mode determiner 11 is merged with at least one neighboring data unit.

If a current data unit is merged with a neighboring data unit, the current data unit may share motion vector information of the neighboring data unit. Although motion vector differential information of the current data unit is independently encoded, since auxiliary prediction information of the current data unit may be derived by following or referring to auxiliary prediction information of the neighboring data unit merged with the current data unit, the auxiliary prediction information of the current data unit is not separately encoded.

The data unit merging determiner 13 may determine at least one candidate data unit group including a data unit that may be merged with the current data unit in regions neighboring the current data unit. The data unit merging determiner 13 may search for one data unit to be merged with the current data unit in the at least one candidate data unit group. In this case, one candidate unit group including a data unit that may be merged with the current data unit may be determined in each region.

According to a predetermined rule preset between encoding and decoding systems, a method of determining a candidate data unit group in at least one region neighboring a current data unit and a method of determining one data unit in the candidate data unit group may be set.

Also, the apparatus 10 may encode and output at least one of information about the method of determining the candidate data unit group in the at least one region neighboring the current data unit and information about the method of determining one data unit in the candidate data unit group.

For example, the data unit merging determiner 13 may search for a data unit having the same reference index as the current data unit in the candidate data unit group and may select the data unit as a candidate data unit to be merged with the current data unit.

Alternatively, the data unit merging determiner 13 may search for a data unit whose prediction mode is an inter mode in the candidate data unit group and may select the data unit as a candidate data unit to be merged with the current data unit. One data unit may be finally determined from among candidate data units selected in this way as a candidate data unit to be merged with the current data unit.

The data unit merging determiner 13 may determine a candidate data unit to be merged with the current data unit by using a general method of a motion vector prediction in inter mode. In detail, according to the general method of a motion vector prediction in inter mode, a plurality of candidate vectors to be predicted with a motion vector of the current data unit are determined from among neighboring data units contacting all boundaries of the current data unit. That is, one from among neighboring data units contacting a left boundary of the current data unit, one from among neighboring data units contacting an upper boundary of the current data unit, and one from among neighboring data units contacting corners of the current data unit are selected, and one of motion vectors of the three data units is determined as a candidate vector.

According the general method of a motion vector prediction in inter mode, the data unit merging determiner 13 may search for and determine one data unit to be merged with the current data unit in a left candidate data unit group including all of a plurality of neighboring data units contacting a left boundary of the current data unit and in an upper candidate data unit group including all of a plurality of neighboring data units contacting an upper boundary of the current data unit.

Also, the data unit merging determiner 13 may search for and determine one data unit to be merged with the current data unit in a corner candidate data unit group including an upper left neighboring data unit, an upper right neighboring data unit, and a lower left neighboring data unit contacting corners of the current data unit in addition to the left candidate data unit group and the upper candidate data unit group of the current data unit.

In this case, a method of determining one candidate data unit in the left candidate data unit group, a method of determining one candidate data unit in the upper candidate data unit group, and a method of determining one candidate data unit in the corner candidate data unit group may be preset. Since each method of determining of one candidate data unit from among a corresponding candidate data unit group may be preset, the method may be implicitly signaled.

Also, a method of finally determining one neighboring data unit to be merged with the current data unit from among one candidate data unit determined in the left candidate data unit group, one candidate data unit determined in the upper candidate data unit group, and one candidate data unit determined in the corner candidate data unit group, that is, three candidate data units, may be preset. That is, since each method of determining of neighboring data unit to be merged with the candidate data unit from may be preset, the method may be implicitly signaled.

For example, the data unit merging determiner 13 may search for a data unit whose prediction mode is an inter mode from among candidate data units and may select the data unit as a candidate data unit to be merged with the current data unit. Alternatively, the data unit merging determiner 13 may search for a data unit having the same reference index as the current data unit from among candidate data units and select the data unit as a candidate data unit to be merged with the current data unit.

Although partitions split for the purpose of more accurate inter prediction of one data unit neighbor one another, the partitions may not be merged with one another.

Since accessible data units from among data units neighboring a current partition may vary according to a shape and a position of the current partition, a merging candidate group including neighboring data units that may be merged may be changed. Accordingly, the data unit merging determiner 13 may search for a neighboring data unit that may be merged based on a shape and a position of a current partition.

The encoding information determiner 15 may determine prediction mode information, merging related information, and prediction related information according to data units. The encoding information determiner 15 may update the prediction related information in encoding information determined by the encoding mode determiner 11 according to data unit merging of the data unit merging determiner 13. The encoding information determiner 15 may encode the encoding information to include the merging related information according to the data unit merging of the data unit merging determiner 13. The encoding information determiner 15 may output the video data encoded by the encoding mode determiner 11 and the encoding information.

The prediction mode information in the prediction related information is information indicating whether a prediction mode of a current data unit is an inter mode, an intra mode, a skip mode, or a direct mode. For example, the prediction mode information may include skip mode information indicating whether the prediction mode of the current data unit is a skip mode and direct mode information indicating whether the prediction mode of the current data unit is a direct mode.

The merging related information includes information used to perform data unit merging or to determine whether data unit merging is performed. For example, the merging related information may include merging information indicating whether a current data unit is to be merged with a neighboring data unit and merging index information indicating a data unit to be merged. The encoding information determiner 15 may encode the merging information through context modeling regarding a combination of 'a prediction mode and a partition type of a neighboring data unit' and regarding 'whether a current data unit and a neighboring data unit are merged'.

The prediction related information may further include auxiliary prediction information and motion information used for prediction encoding of a data unit. For example, as described above, the prediction related information may include auxiliary prediction information referring to additional information related to prediction encoding including a reference index indicating a data unit to be referred to and the like, and motion vector or motion vector differential information.

The encoding information determiner 15 may determine whether the merging related information is set according to the prediction mode information based on a close relationship between a prediction mode of a data unit and a possibility that the data unit is merged.

In a first exemplary embodiment where data unit merging may be performed on a data unit other than a skip mode, the encoding information determiner 15 may encode skip mode information indicating whether a prediction mode of a current data unit is a skip mode, and may determine whether merging information indicating whether the current data unit and a neighboring data unit are merged with each other based on the skip mode information.

In detail, in the first exemplary embodiment, if a prediction mode of the current data unit is a skip mode, the encoding information determiner 15 may set skip mode information to indicate that the prediction mode of the current data unit is a skip mode and may not encode merging information of the current data unit.

If a prediction mode of the current data unit is not a skip mode, the encoding information determiner 15 may set skip mode information to indicate that the prediction mode of the current data unit is not a skip mode and may encode merging information of the current data unit.

The encoding information determiner 15 may encode motion vector differential information of a data unit based on the merging information, and may determine whether auxiliary prediction information of the data unit is encoded.

That is, if a current data unit is merged with a neighboring data unit, the encoding information determiner 15 may set merging information of the current data unit to indicate that the current data unit is merged with the neighboring data unit, and may not encode auxiliary prediction information of the current data unit. On the other hand, if the current data unit is not merged with the neighboring data unit, the encoding information determiner 15 may set merging information of the current data unit to indicate that the current data unit is not merged with the neighboring data unit, and may encode auxiliary prediction information of the current data unit.

Regardless of whether the current data unit is merged or not with the neighboring data unit, the encoding information determiner 15 may encode motion vector differential information of the current data unit.

Also, in a second exemplary embodiment where it is determined whether data unit merging is performed on a data unit other than a skip mode and a direct mode, the encoding information determiner 15 may encode merging related information for indicating whether data unit merging is performed on a data unit whose prediction mode is a direct mode.

In detail, in the second exemplary embodiment, the encoding information determiner 15 may set skip mode information to indicate that the prediction mode of a data unit is not a skip mode, and may encode direct mode information. Also, the encoding information determiner 15 may determine whether merging information is encoded based on the direct mode information.

That is, if a prediction mode of a current data unit is a direct mode, the encoding information determiner 15 may set direct mode information to indicate that a prediction mode of the current data unit is a direct mode and may not encode merging information of the current data unit. If a prediction mode of a current data unit is not a direct mode, the encoding information determiner 15 may set direct mode information to indicate that a prediction mode of the current data unit is not a direct mode and may encode merging information of the current data unit.

If merging information is encoded, it is determined whether auxiliary prediction information of the current data unit is encoded based on the merging information, and motion vector differential information of the current data unit is encoded as described above in the first exemplary embodiment.

A data unit obtained by splitting a picture may include 'a coding unit' that is a data unit for encoding a picture, 'a prediction unit' for prediction encoding, and 'a partition' for inter prediction. The data unit merging determiner 13 may determine whether merging with a neighboring data unit is performed for each coding unit, and the encoding information determiner 15 may determine skip mode information and merging information for each coding unit. Also, the data unit merging determiner 13 may determine whether merging with a neighboring data unit is performed for each prediction unit, and the encoding information determiner 105 may determine skip mode information and merging information for each prediction unit.

If both skip mode information and merging information are used, since unique prediction information of a current data unit is not encoded in the case of both a skip mode and data merging, the apparatus 10 may distinguish a prediction method according to a skip mode from a prediction method according to data merging. For example, a reference index and a reference direction of a data unit having a skip mode may be determined according to a preset rule, and a data unit merged with a neighboring data unit may follow a reference index and a reference direction of motion information of the neighboring data unit. Since the rule for determining a reference index and a reference direction of a data unit having a skip mode may be preset, the rule may be implicitly signaled.

The encoding information determiner 15 may encode skip mode information for each prediction mode and may encode merging related information for each partition. Also, the encoding information determiner 15 may encode both merging related information and skip mode information for each data unit. Alternatively, the encoding information determiner 15 may set merging related information to be encoded only for a data unit having a preset predetermined prediction mode.

The apparatus 10 may determine data unit merging between coding units or determine data unit merging between prediction units. Also, the apparatus 10 may selectively encode skip mode information and direct mode information. Accordingly, if a prediction mode of a data unit is not a skip mode based on skip mode information of the data unit, the encoding information determiner 15 may encode at least one of skip/direct mode encoding information indicating whether direct mode information of the data unit is encoded, coding unit merging determining information indicating whether an occurrence of merging between coding units is determined, and prediction unit merging determining information indicating whether an occurrence of merging between prediction units is determined.

Figure 2:
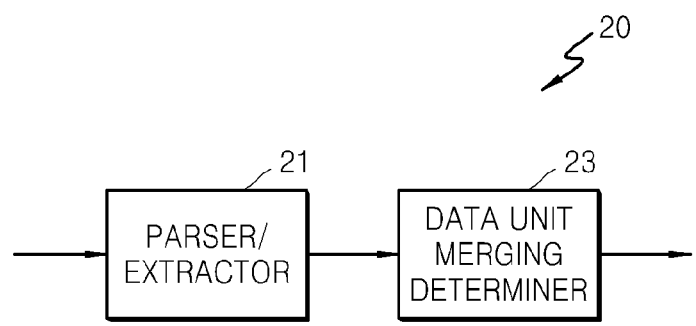
FIG. 2 is a block diagram of an apparatus for decoding a video by using data unit merging, according to an exemplary embodiment.

FIG. 2 is a block diagram of an apparatus 20 for decoding a video by using data unit merging, according to an exemplary embodiment.

The apparatus 20 includes a parser/extractor 21 and data unit merger/decoder 23. For convenience of explanation, the apparatus 20 for decoding a video by using data unit merging is referred to as 'an apparatus 20 for decoding a video'.

The apparatus 20 receives a bitstream of encoded video data, extracts encoding information including information about an encoding method and the encoded video data, and performs decoding through entropy decoding, inverse quantization, inverse transformation, and inter prediction/compensation between pictures to restore video data.

The parser/extractor 21 parses the received bitstream to extract the encoded video data and the encoding information and to extract prediction mode information, merging related information, and prediction related information in the encoding information. The parser/extractor 21 may extract skip mode information, direct mode information, and the like as the prediction mode information. The parser/extractor 21 may extract auxiliary prediction information including a reference direction and a reference index, and motion vector differential information as the prediction related information.

The parser/extractor 21 may extract merging information, merging index information, and the like as the merging related information. The parser/extractor 21 may read merging information encoded through context modeling regarding a combination of 'a prediction mode and a partition type of a neighboring data unit' and 'whether a current data unit and the neighboring data unit are merged with each other', and may analyze the prediction mode and the partition type of the neighboring data unit merged with the current data unit.

First, in a first exemplary embodiment where whether data unit merging is performed on a data unit other than a skip mode is determined, the parser/extractor 21 may extract and read skip mode information of the data unit from a received bitstream, and may determine whether merging information of the data unit is extracted based on the skip mode information. That is, if it is read that a prediction mode of a current data unit is not a skip mode based on skip mode information, the parser/extractor 21 may extract merging information of the current data unit from the received bitstream.

The parser/extractor 21 may extract motion vector differential information of a data unit based on the merging information, and may determine whether inter auxiliary prediction information of the data unit is extracted. That is, if it is read that a current data unit is not merged with a neighboring data unit based on merging information, the parser/extractor 21 may extract motion vector differential information from a received bitstream and may extract auxiliary prediction information of the current data unit. On the other hand, if it is read that a current data unit is merged with a neighboring data unit based on merging information, the parser/extractor 21 may extract motion vector differential information from a received bitstream and may not extract auxiliary prediction information of the current data unit.

Next, in a second exemplary embodiment where whether data unit merging is performed on a data unit other than a skip mode and a direct mode is determined, if a prediction mode of a data unit is not a skip mode, the parser/extractor 21 may extract direct mode information of the data unit, and may determine whether merging information is extracted based on the direct mode information.

That is, if it is read that a prediction mode of a current data unit is a direct mode according to direct mode information, the parser/extractor 21 may not extract merging information from a received bitstream. On the other hand, if it is read that a prediction mode of a current data unit is not a direct mode according to direct mode information, the parser/extractor 21 may extract merging information from a received bitstream.

The parser/extractor 21 may extract motion vector differential information of a data unit based on the merging information and may determine whether auxiliary prediction information is extracted as described above in the first embodiment.

The data unit merger/decoder 23 analyzes whether merging with at least one neighboring data unit is performed based on at least one of a prediction mode and an encoding mode according to data units based on prediction mode information and merging related information. The data unit merger/decoder 23 may determine a data unit based on encoding information and decode the encoded video data according to the determined data unit to restore a picture.

For example, the data unit merger/decoder 23 may perform inter prediction and motion compensation by using prediction related information of a neighboring data unit on a data unit merged with the neighboring data unit to decode video data based on encoding information.

The parser/extractor 21 may extract and read skip mode information and merging information for each coding unit, and the data unit merger/decoder 23 may determine whether merging with a neighboring data unit is performed based on merging information for each coding unit.

Also, the parser/extractor 21 may extract and read skip mode information and merging information for each prediction unit, and the data unit merger/decoder 23 may determine whether merging with a neighboring data unit is generated based on merging information for each prediction unit.

The data unit merger/decoder 23 may read whether a current data unit is merged with a neighboring data unit based on merging related information extracted by the parser/extractor 21, and may search for a data unit to be merged from among neighboring data units.

First, the data unit merger/decoder 23 may analyze whether a current data unit is merged with a neighboring data unit based on merging information in merging related information. If it is read that the current data unit is merged with the neighboring data unit, the data unit merger/decoder 23 may determine at least one candidate data unit group including a data unit that may be merged with the current data unit in regions neighboring the current data unit based on merging index information in merging related information. The data unit merger/decoder 23 may determine one data unit to be merged with the current data unit in the at least one candidate data unit group. A candidate data unit group for merging of the current data unit may be determined for each of at least one region neighboring the current data unit.

Since each method of determining of neighboring data unit to be merged with the candidate data unit from may be preset, the method may be implicitly signaled. The data unit merger/decoder 23 may determine one data unit to be merged with the current data unit based on at least one of a method of determining a candidate data unit group that is preset according to a predetermined rule between encoding/decoding systems and a method of determining one data unit in the candidate data unit group.

The parser/extractor 21 may extract at least one of information about a method of determining a candidate data unit group from among at least one region neighboring the current data unit and information about a method of determining one data unit in the candidate data unit group. The data unit merger/decoder 23 may determine one data unit to be merged with the current data unit based on at least one of information about a method of determining an extracted candidate data unit group and information about a method of determining one data unit in the candidate data unit group.

For example, if the data unit merger/decoder 23 sets a first candidate data unit, a second candidate data unit, or a third candidate data unit according to the preset method, the data unit merger/decoder 23 may search for a neighboring data unit having the same reference index as the current data unit in a merging candidate group of upper-layer neighboring data units, and may determine the neighboring data unit as one data unit to be merged.

Alternatively, if the data unit merger/decoder 23 determines a first candidate data unit, a second candidate data unit, or a third candidate data unit according to the preset method, the data unit merger/decoder 23 may search for a neighboring data unit whose prediction mode is an inter mode in a merging candidate group of upper-layer neighboring data units and may determine the neighboring data unit as one data unit to be merged with the current data unit.

Since each method of determining of one candidate data unit from among a corresponding candidate data unit group may be preset, the method may be implicitly signaled.

The data unit merger/decoder 23 may determine a candidate data unit to be merged with the current data unit by using the general method of a motion vector prediction in inter mode. In detail, the data unit merger/decoder 23 may determine one data unit to be merged with the current data unit in a left candidate data unit group including all of a plurality of left neighboring data units contacting a left boundary of the current data unit and an upper candidate data unit group including all of a plurality of upper neighboring data units contacting an upper boundary based on merging index information in merging related information.

Also, the data unit merger/decoder 23 may determine one data unit to be merged with the current data unit based on merging index information in a corner candidate data unit group including an upper left neighboring data unit, an upper right neighboring data unit, and a lower left neighboring data unit contacting corners of the current data unit, in addition to the left candidate data unit group and the upper candidate data unit group of the current data unit.

In detail, the data unit merger/decoder 23 may read merging index information and may determine a first candidate data unit that is one in the left candidate data unit group, a second candidate data unit that is one in the upper candidate data unit group, or a third candidate data unit that is one in the corner candidate data unit group as a neighboring data unit to be merged with the current data unit.

Also, the data unit merger/decoder 23 may search for and determine one from among the left neighboring data units if the first candidate data unit is determined, one from among the upper neighboring data units if the second candidate data unit is determined, and one from among the neighboring data units contacting the corners if the third candidate data unit is determined as one data unit to be merged with the current data unit.

In this case, a method of searching for and determining one data unit to be merged with the current data unit from among the left neighboring data units, the upper neighboring data units, and the neighboring data units contacting the corners may be preset. For example, according to a preset method, the data unit merger/decoder 23 may search for a neighboring data unit whose prediction mode is an inter mode from among candidate data units and may determine the neighboring data unit as one data unit to be merged with the current data unit.

Alternatively, according to a preset method, the data unit merger/decoder 23 may search for a neighboring data unit having the same reference index as the current data unit from among candidate data units and may determine the neighboring data unit as one data unit to be merged.

Since each method of determining of neighboring data unit to be merged with the candidate data unit from may be preset, the method may be implicitly signaled.

The data unit merger/decoder 23 may not perform mutual merging between partitions in one data unit.

The data unit merger/decoder 23 may determine a data unit to be merged with the current data unit in a merging candidate group of neighboring data units that vary according to a shape and a position of a current partition.

The parser/extractor 21 may extract skip mode information for each prediction unit and may extract merging related information for each partition. Alternatively, the parser/extractor 21 may extract merging related information and skip mode information for each data unit. Also, the parser/ extractor 21 may extract merging related information only for a data unit having a predetermined prediction mode.

The parser/extractor 21 may sequentially extract skip mode information, prediction unit information, partition information, and merging information of a prediction unit. The partition information may include information about whether the prediction unit is split into partitions and information about a partition type.

The apparatus 20 may decode video data by performing data unit merging between coding units or between prediction units. Also, the apparatus 20 may selectively decode video data according to encoded skip mode information and direct mode information.

Accordingly, if a prediction mode of a data unit is not a skip mode based on skip mode information of the data unit, the parser/extractor 21 may extract at least one of skip/direct mode encoding information indicating whether direct mode information of the data unit is encoded, coding unit merging determining information indicating whether an occurrence of merging of coding units is determined, and prediction unit merging determining information indicating whether an occurrence of merging between prediction units is determined. Also, the data unit merger/decoder 23 may perform decoding by using both a skip mode and a direct mode based on the extracted information, or may decode video data subjected to data unit merging based on a coding unit or a prediction unit.

The data unit merger/decoder 23 may decode video data by determining a reference index and a reference direction of a data unit having a skip mode according to a preset rule and following a reference index and a reference direction of motion information of a neighboring data unit for the data unit merged with the neighboring data unit. Since the rule of determining of a reference index and a reference direction of a data unit having a skip mode may be preset, the rule may be implicitly signaled.

As a video resolution increases, the amount of data rapidly increases, and a size of a data unit increases, redundant data increases and thus a data unit having a skip mode or a direct mode increases. However, since a prior macroblock merging method determines whether only a macroblock whose prediction mode is an inter mode other than a skip mode and a direct mode is merged and merges the macroblock with a neighboring macroblock having a fixed size and a fixed position, the prior macroblock merging method is applied to limited areas.

The apparatus 10 and the apparatus 20 may perform data unit merging on data units having various sizes, various shapes, and various prediction modes, and may merge data units with neighboring data units having various positions. Accordingly, since various data units share prediction related information of more various neighboring data units, redundant data may be removed by referring to peripheral information in a wider range, thereby improving video encoding efficiency.

Figure 3:
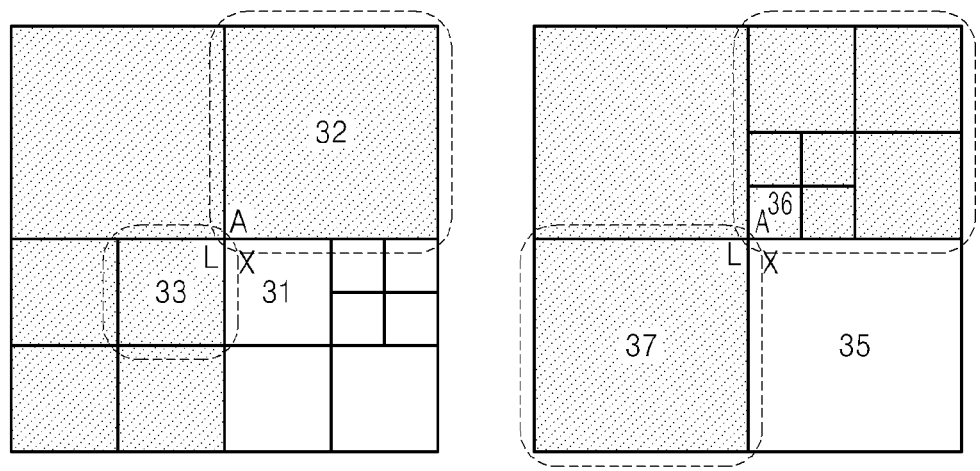
FIG. 3 is a diagram illustrating neighboring blocks that may be merged with a current macroblock according to a related art.

FIG. 3 is a diagram illustrating neighboring blocks that may be merged with a current macroblock according to a related art.

According to a block merging method according to a related art, a neighboring block included in a merging candidate group of neighboring blocks to be merged with the current macroblock should be a neighboring block that has an inter mode and is encoded prior to the current macroblock. Accordingly, only blocks neighboring an upper boundary and a right boundary of the current macroblock may be included in a merging candidate group.

Merged blocks may constitute one region, and encoding information and merging related information may be encoded according to regions of merged blocks. For example, merging information about whether block merging is performed, and if block merging is performed, merging block position information indicating which block is merged from among an upper neighboring block and a left neighboring block of the current macroblock may be encoded.

According to the block merging method according to a related art, although a plurality of blocks contact boundaries of the current macroblock, only a neighboring block contacting an upper left sample of the current block may be selected to be merged with the current macroblock.

That is, one of a first upper neighboring block 32 neighboring an upper boundary of a first current macroblock 31 and contacting an upper left sample of the first current macroblock 31 and a second left neighboring block 33 neighboring a left boundary of the first current macroblock 31 and contacting the upper left sample of the first macroblock 31 may be selected to be merged with the first current macroblock 31.

Likewise, one of a second upper neighboring block 36 and a second left neighboring block 37 contacting an upper left sample of a second current macroblock 35 may be selectively merged with the second current macroblock 35.

Figure 4:
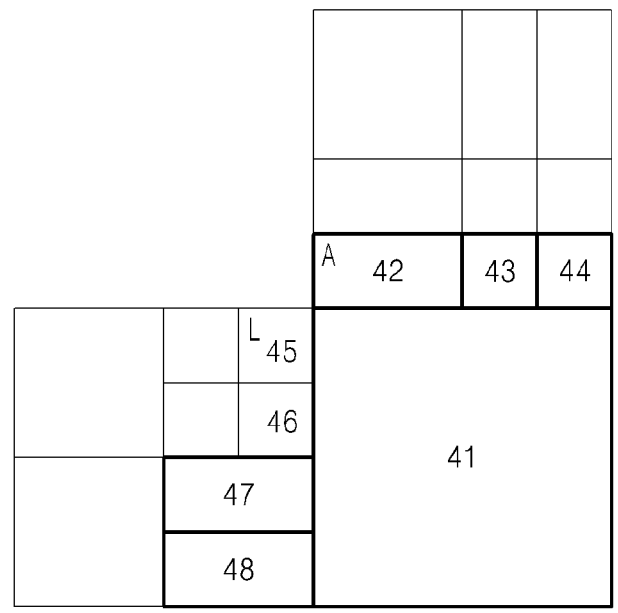
FIGS. 4 and 5 are diagrams for explaining methods of selecting a data unit to be merged with a current data unit from among neighboring data units of the current data unit, according to a related art and an exemplary embodiment, respectively.
Figure 5:
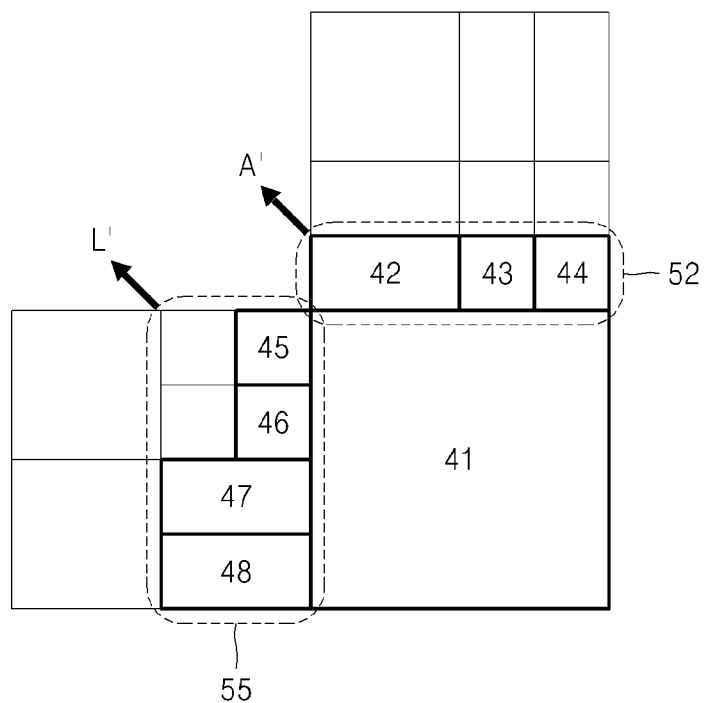

FIGS. 4 and 5 are diagrams for explaining methods of selecting one data unit to be merged with a current data unit from among neighboring data units of the current data unit, according to a related art and an exemplary embodiment, respectively.

Referring to FIG. 4, according to a data unit merging method according to a related art, although neighboring data units 42, 43, and 44 contact an upper boundary of a current data unit 41 and neighboring data units 45, 46, 47, and 48 contact a left boundary of the current data unit 41, a data unit to be merged with the current data unit 41 is limited to the data unit 42 as an upper neighboring data unit or the data unit 45 as a left neighboring data unit. Also, since only merging with a neighboring data unit whose prediction mode is an inter mode is possible, if prediction modes of the neighboring data units 42 and 44 are skip modes or direct modes, the neighboring data units 42 and 44 are not considered as data units to be merged.

According to a data unit merging method of the apparatus 10 and the apparatus 20 of FIG. 5, a merging candidate group of neighboring data units that may be merged with the current data unit 41 may include all of the upper neighboring data units 42, 43, and 44 and the left neighboring data units 45, 46, 47, and 48. In this case, even when a prediction mode of the current data unit 41 is a skip mode or a direct mode as well as an inter mode, whether the current data unit 41 is merged with a neighboring data unit may be determined.

For example, one of an upper merging candidate group 52 including the upper neighboring data units 42, 43, and 44 of the current data unit 41 may be determined as an upper merging candidate A'. Likewise, one of a left merging candidate group 55 including the left neighboring data units 45, 46, 47, and 48 of the current data unit 41 may be determined as a left merging candidate L'. One of the upper merging candidate A' and the left merging candidate L' may be finally determined to be a neighboring data unit to be merged with the current data unit 41.

The apparatus 10 and the apparatus 20 may determine a method of determining one of the upper merging candidate group 52 as the upper merging candidate A' and a method of determining one of the left merging candidate group 55 as the left merging candidate L' according to a preset method.

The information about the present method may be implicitly signaled. Even though information about the present method is not separately encoded to search for the upper merging candidate A' in the upper merging candidate group 52 or search for the left merging candidate L' in the left merging candidate group 55, the apparatus 10 and the apparatus 20 may perceive the preset method in which the upper merging candidate A' and the left merging candidate L' are searched for.

For example, neighboring data units having the same reference index information as the current data unit 41 in the upper merging candidate group 52 and the left merging candidate group 55 may be determined as the upper merging candidate A' and the left merging candidate L'. Alternatively, neighboring data units closest to an upper left sample of the current data unit 41 whose prediction mode is an inter mode in the upper merging candidate group 52 and the left merging candidate group 55 may be determined as the upper merging candidate A' and the left merging candidate L'.

Likewise, the apparatus 10 and the apparatus 20 may finally determine one of the upper merging candidate A' and the left merging candidate L' as a neighboring data unit to be merged with the current data unit 41 according to a preset method.

Figure 6:
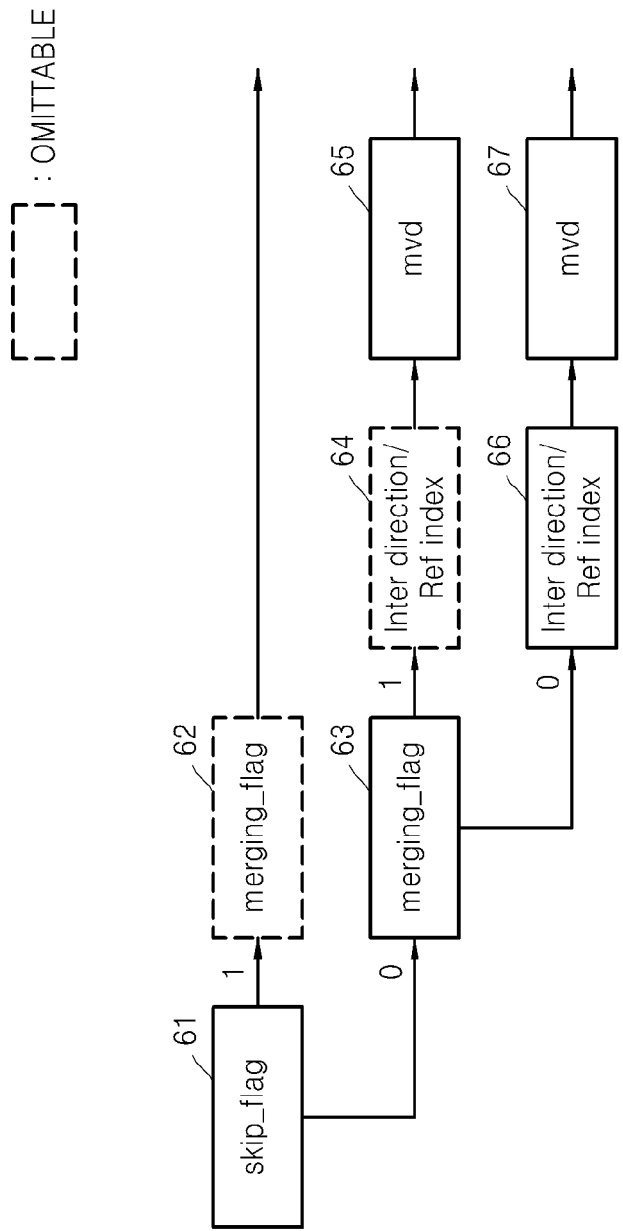
FIGS. 6 and 7 are block diagrams for explaining orders of encoding and decoding prediction mode information, merging related information, and prediction related information, according to exemplary embodiments.
Figure 7:
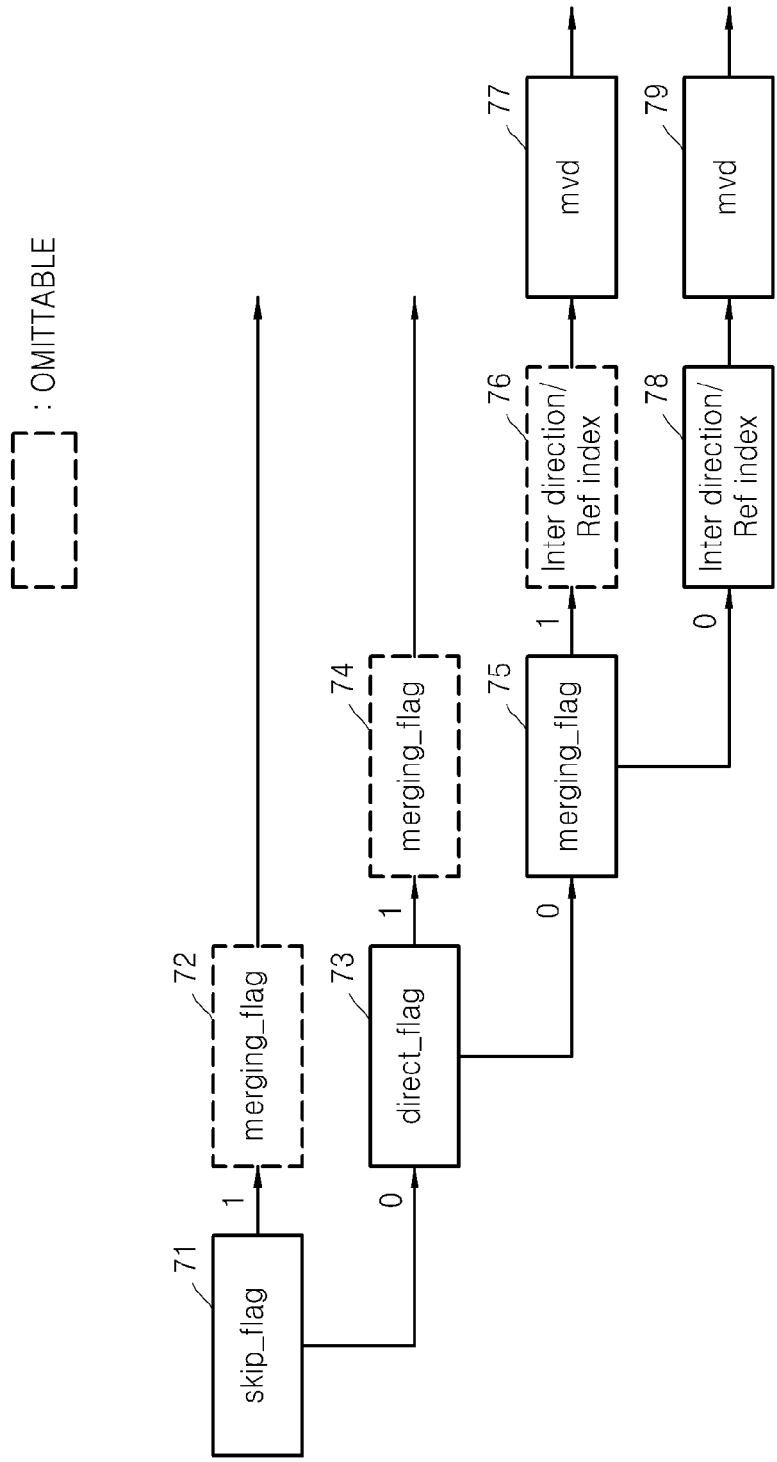

FIGS. 6 and 7 are block diagrams for explaining orders of encoding and decoding prediction mode information, merging related information, and prediction related information, according to exemplary embodiments.

First, FIG. 6 is a block diagram for explaining a method of encoding and decoding prediction mode information, merging related information, and prediction related information, according to a first exemplary embodiment in which an occurrence of data unit merging is determined in consideration of whether a prediction mode of a current data unit is a skip mode.

In operation 61, the apparatus 10 encodes skip mode information 'skip_flag' of a current data unit. If a prediction mode of the current data unit is a skip mode, the skip mode information 'skip_flag' may be set to 1, and if a prediction mode of the current data unit is not a skip mode, the skip mode information 'skip_flag' may be set to 0.

If it is determined in operation 61 that the prediction mode of the current data unit is a skip mode, the method proceeds to operation 62. In operation 62, merging information 'merging_flag' may not be encoded. If it is determined in operation 61 that the prediction mode of the current data unit is not a skip mode, the method proceeds to operation 63. In operation 63, the merging information 'merging_flag' is encoded. Prediction direction and reference index information of the current data unit whose prediction mode is a skip mode may be determined according to a preset rule. For prediction direction and reference index information of the current data unit to be merged with a neighboring data unit, a reference index and a reference direction of a motion vector of the neighboring data unit may be followed or referred.

For example, if there is preset a rule that if a current slice is a P slice, a prediction direction of a data unit whose prediction mode is a skip mode is set to a List0 direction, if a current slice is a B slice, a prediction mode is set to a Bi direction, and a reference index of the data unit whose prediction mode is a skip mode is set to 0, prediction encoding of the data unit whose prediction mode is a skip mode may be possible according to the rule.

If the current data unit is merged with a neighboring data unit, the merging information 'merging_flag' of the current data unit may be set to 1 and if the current data unit is not merged with a neighboring data unit, the merging information 'merging_flag' of the current data unit may be set to 0. In operation 64, if the current data unit is merged with a neighboring data unit, since auxiliary prediction information for prediction encoding of the current data unit may be followed or derived from information of the neighboring data unit, prediction direction and reference index information 'Inter direction/Ref index' of the current data unit may not be encoded. In operation 65, although the current data unit is merged with the neighboring data unit, motion vector differential information 'mvd' is encoded.

In operation 66, if the current data unit is not merged with a neighboring data unit, the prediction direction and reference index information 'Inter direction/Ref index' of the current data unit may be encoded, and in operation 67, the motion vector differential information 'mvd' may be encoded. For example, a prediction direction of the current data unit may include a list0 direction, a List1 direction, and a Bi direction.

The apparatus 20 may extract and read skip mode information of a current data unit and may extract and read merging information and prediction related information based on the skip mode information as in the method of operations 61 through 67.

FIG. 7 is a block diagram for explaining a method of encoding/decoding prediction mode information, merging related information, and prediction related information, according to a second exemplary embodiment in which an occurrence of data unit merging is determined in consideration of whether a prediction mode of a current data unit is a skip mode and a direct mode.

In operation 71, the apparatus 10 encodes skip mode information 'skip_flag' of the current data unit. If it is determined in operation 71 that a prediction mode of the current data unit is a skip mode, the method proceeds to operation 72. In operation 72, merging information 'merging_flag' may not be encoded.

If it is determined in operation 71 that the prediction mode of the current data unit is not a skip mode, the method proceeds to operation 73. In operation 73, direct mode 'direct_flag' is encoded. If the prediction mode of the current data unit is a direct mode, the direct mode information 'direct_flag' of the current data unit may be set to 1 and if the prediction mode of the current data unit is not a direct mode, the direct mode information 'direct_flag' of the current data unit may be set to 0. If it is determined in operation 73 that the prediction mode of the current data unit is a direct mode, the method proceeds to operation 74. In operation 74, the merging information 'merging_flag' may not be encoded.

If it is determined in operation 73 that the prediction mode of the current data unit is not a direct mode, the method proceeds to operation 75. In operation 75, the merging information 'merging_flag' is encoded. In operation 76, if the current data unit is merged with a neighboring data unit, prediction direction and reference index information 'Inter direction/Ref index' of the current data unit may not be encoded, and in operation 77, motion vector differential information 'mvd' is encoded. In operations 78 and 79, if the current data unit is not merged with a neighboring data unit, the prediction direction and reference index information 'Inter direction/Ref index' of the current data unit and the motion vector differential information 'mvd' may be encoded.

The apparatus 20 may extract and read skip mode information or direct mode information of a current data unit and may extract and read merging information and prediction related information based on the skip mode information or the direct mode information as in the method of operations 71 through 79.

Figure 8:
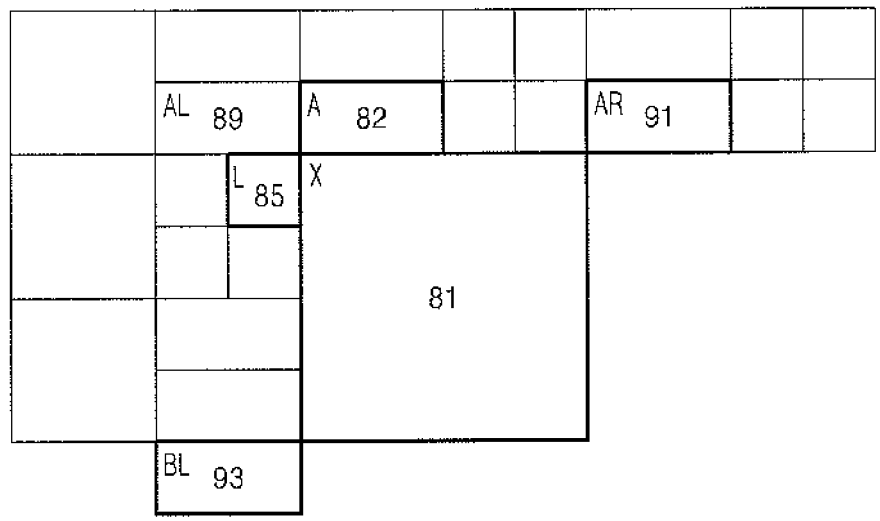
FIGS. 8 and 9 are diagrams for explaining methods of selecting a data unit to be merged with a current data unit from among extended neighboring data units of the current data unit, according to a related art and an exemplary embodiment, respectively.
Figure 9:
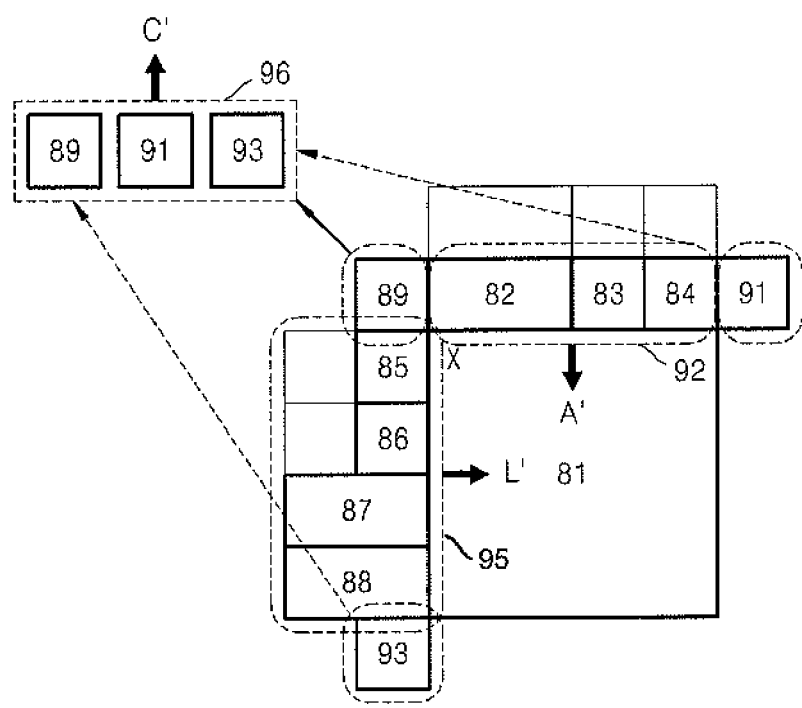

FIGS. 8 and 9 are diagrams for explaining methods of selecting one data unit to be merged with a current data unit from among extended neighboring data units of the current data unit, according to a related art method and an exemplary embodiment, respectively.

According to a related art data unit merging method of FIG. 8, objects to be merged with a current data unit 81 are limited to an upper neighboring data unit 82 and a left neighboring data unit 85 contacting an upper left sample of the current data unit 81. That is, neighboring data units 89, 91, and 93 contacting an upper left corner, an upper right corner, and a lower left corner of the current data unit 81 are not included in a merging candidate group of the current data unit 81.

A data unit merging method of FIG. 9 is similar to a motion vector prediction method of an inter mode. In FIG. 9, a merging candidate group of neighboring data units that may be merged with the current data unit 81 may include not only upper neighboring data units 82, 83, and 84 and left neighboring data units 85, 86, 87, and 88 but also neighboring data units 89, 91, and 93 contacting an upper left corner, an upper right corner, and a lower left corner of the current data unit 81.

For example, one of an upper merging candidate group 92 including the upper neighboring data units 82, 83, and 84 of the current data unit 81 may be determined as an upper merging candidate A', and one of a left merging candidate group 95 including the left neighboring data units 85, 86, 87, and 88 may be determined as a left merging candidate L'. Also, one of a corner merging candidate group 96 including the neighboring data units 89, 91, and 93 contacting the upper left corner, the upper right corner, and the lower left corner of the current data unit 81 may be determined as a corner merging candidate C'. One of the upper merging candidate A', the left merging candidate L', and the corner merging candidate C' may be finally determined as a neighboring data unit to be merged with the current data unit 81.

A method of determining one of the upper merging candidate group 92 as the upper merging candidate A' a method of determining one of the left merging candidate group 95 as the left merging candidate L', a method of determining one of the corner merging candidate group 96 as the corner merging candidate C', and a method of finally determining one of the upper merging candidate A', the left merging candidate L', and the corner merging candidate C' may follow a preset rule as described with reference to FIG. 5.

In FIG. 9, since directions of candidate data units that may be merged with the current data unit 81 include upper, lower, and corner, merging position information may be expressed as a merging index, not a flag type of 0 or 1.

Figure 10:
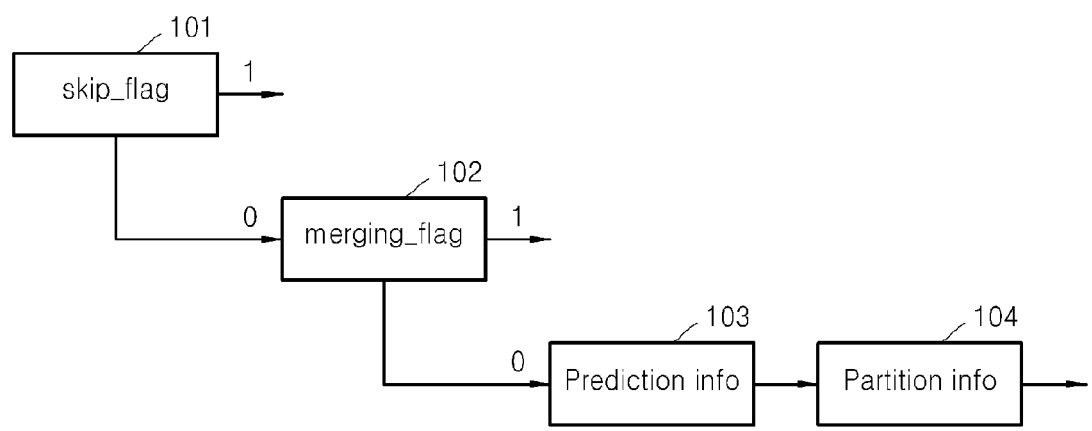
FIGS. 10, 11, and 12 are block diagrams for explaining orders of encoding and decoding prediction mode information, merging related information, and prediction related information, according to various exemplary embodiments.
Figure 11:
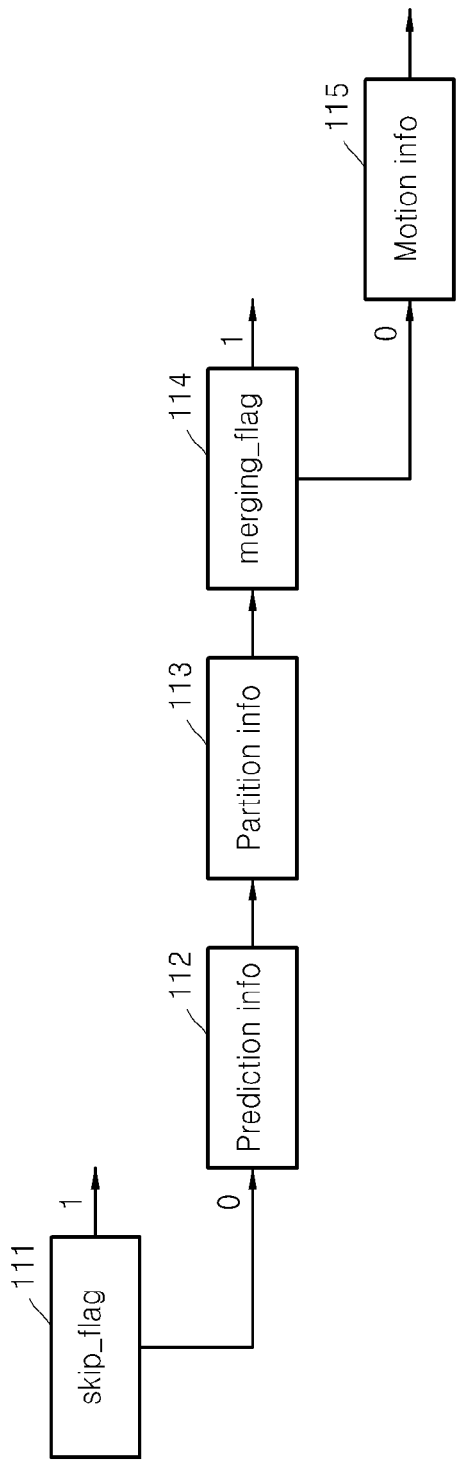
Figure 12:
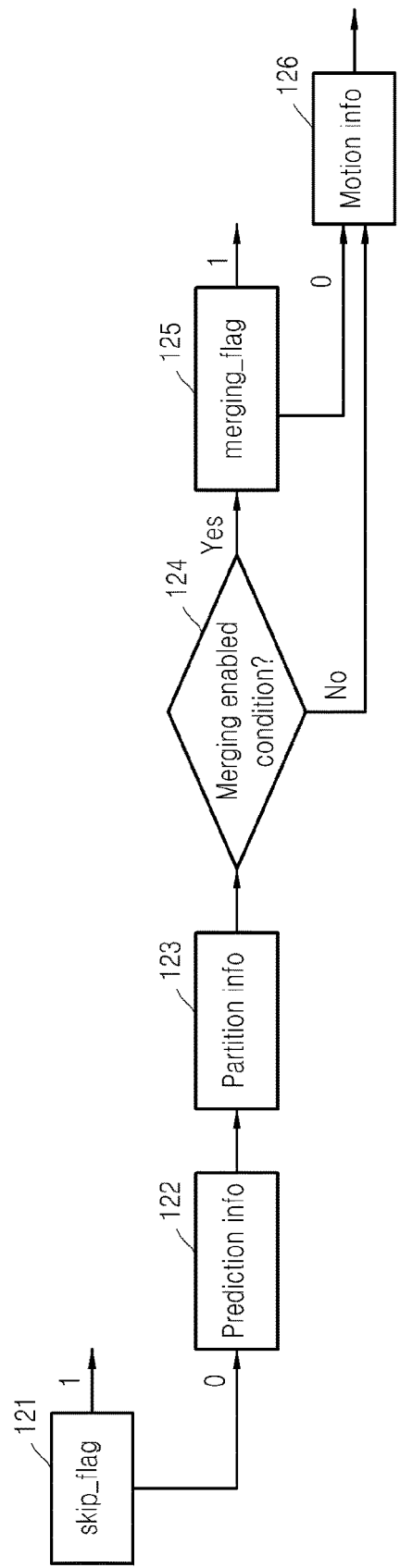

FIGS. 10, 11, and 12 are block diagrams for explaining orders of encoding and decoding prediction mode information, merging related information, and prediction related information, according to various exemplary embodiments.

Referring to FIG. 10, the apparatus 10 may encode skip mode information and merging information for each prediction unit that is a data unit for prediction encoding.

In operation 101, the apparatus 10 may encode skip mode information 'skip_flag' of a prediction unit, and in operation 102, the apparatus 10 may encode merging information 'merging_flag' of a prediction unit other than a skip mode. In operations 103 and 104, the apparatus 10 may encode unique prediction mode information 'Prediction info' and partition information 'Partition info' of a prediction unit whose prediction mode is not a skip mode and which is not merged with a neighboring data unit.

Accordingly, the apparatus 20 may extract and read skip mode information and merging information for each prediction unit. The apparatus 20 may extract unique prediction mode information and partition information of a prediction unit whose prediction mode is not a skip mode and which is not merged with a neighboring data unit.

Referring to FIG. 11, the apparatus 10 may encode skip mode information for each prediction unit, and may encode merging information of each partition obtained by splitting a prediction unit for the purpose of more accurate prediction encoding.

In operation 111, the apparatus 10 may encode skip mode information 'skip_flag' of a prediction unit, in operation 112, the apparatus 10 may encode prediction mode information 'Prediction info' of a prediction unit whose prediction mode is not a skip mode, and in operation 113, the apparatus 10 may encode partition information 'Partition info'.

In operation 114, the apparatus 10 may encode merging information 'merging_flag' for each partition of the prediction unit whose prediction mode is not a skip mode. In operation 115, the apparatus 10 may encode unique motion information 'Motion info' of a partition which is not merged with a neighboring data unit from among partitions of the prediction unit whose prediction mode is not a skip mode.

Accordingly, the apparatus 20 may extract and read skip mode information for each prediction unit, and may extract and read merging information for each partition. The apparatus 20 may extract unique motion information of a partition whose prediction mode is not a skip mode and which is not merged with a neighboring unit.

Referring to FIG. 12, the apparatus 10 may encode skip mode information for each prediction unit, and may encode merging information for each partition when a predetermined condition is satisfied.

In operation 121, the apparatus 10 may encode skip mode information 'skip_flag' of a prediction unit, in operation 122, the apparatus 10 may encode prediction mode information 'Prediction info' of a prediction unit whose prediction mode is not a skip mode, and in operation 123, the apparatus may encode partition information 'Partition info'.

In operation 124, the apparatus 10 determines whether a predetermined condition is satisfied for each partition of the prediction unit. In operation 125, merging information 'merging_flag' of only a data unit satisfying the predetermined condition from among partitions of the prediction unit whose prediction mode is not a skip mode may be encoded.

In operation 126, the apparatus 10 encodes unique motion information 'Motion info' of a partition which satisfies the predetermined condition and is not merged with a neighboring data unit and a partition which does not satisfy the predetermined condition from partitions of the prediction unit whose prediction mode is not a skip mode.

A predetermined condition of a partition for encoding merging information may include a case where a prediction mode of a partition is a predetermined prediction mode. For example, merging information of a partition may be encoded according to a condition that a prediction mode is not a skip mode but an inter mode (non-skip mode), a condition that a prediction mode is not a skip mode and a direct mode but an inter mode (non-skip inter mode and non-direct inter mode), or a condition that a prediction mode is an inter mode that is not split by a partition (non-partitioned inter mode).

In detail, in operation 124, if data unit merging is performed on a data unit whose prediction mode is not a skip mode and a direct mode but an inter mode, the apparatus 10 may determine whether prediction modes of partitions of a prediction unit other than a skip mode are not direct modes but inter modes. In operation 125, merging information 'merging_flag' of a partition whose prediction mode is not a direct mode may be encoded. In operation 126, unique motion information 'Motion info' of a partition whose prediction mode is not a direct mode and which is not merged with a neighboring data unit and a partition whose prediction mode is a direct mode may be encoded.

Accordingly, the apparatus 20 may extract and read skip mode information for each prediction mode, and may extract and read merging information for each partition. The apparatus 20 may extract and unique motion information of a partition whose prediction mode is not a skip mode and which satisfies a predetermined condition but is not merged with a neighboring data unit and a partition which does not satisfy the predetermined condition.

Figure 13:
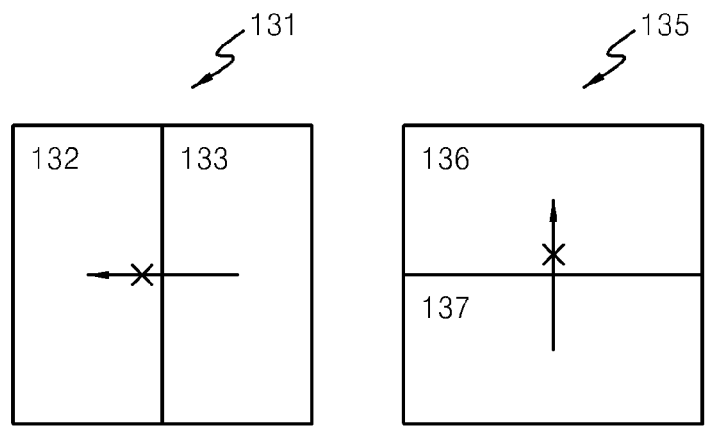
FIG. 13 is a diagram illustrating neighboring data units that are not merged with a current partition, according to an exemplary embodiment.

FIG. 13 is a diagram illustrating neighboring data units that are not merged with a current partition, according to an exemplary embodiment.

A data unit for prediction encoding, that is, a prediction unit, may be split into two or more partitions for more accurate prediction encoding. For example, a width of a first prediction unit 131 may be split into a first partition 132 and a second partition 133.

Since the first partition 132 and the second partition 133 have different motion characteristics even though the first partition 132 and the second partition 133 are included in the first prediction unit 131, data unit merging may be not performed between the first partition 132 and the second partition 133. Accordingly, the apparatus 10 may not determine whether data unit merging is performed between the first partition 132 and the second partition 133 in the same first prediction unit 131. Also, merging index information for the second partition 133 may not include an index indicating a left neighboring data unit.

Even when a height of a second prediction unit 135 is split into a third partition 136 and a fourth partition 137, since data unit merging should not be performed between the third partition 136 and the fourth partition 137, the apparatus 10 may not determine whether data unit merging is performed between the third partition 136 and the fourth partition 137. Also, merging index information for the fourth partition 137 may not include an index indicating an upper neighboring data unit.

Figure 14:
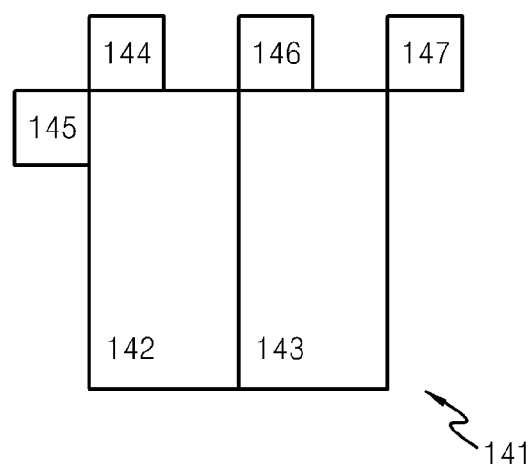
FIG. 14 is a diagram illustrating a candidate data unit that varies according to a shape and a position of a current partition, according to an exemplary embodiment.

FIG. 14 is a diagram illustrating a candidate data unit that varies according to a shape and a position of a current partition, according to an exemplary embodiment.

According to a shape and a position of a partition, a position of neighboring data unit to be merged may vary. For example, if a prediction unit 141 is split into left and right partitions 142 and 143, neighboring data unit candidates that may be merged with the left partition 142 may a data unit 144 neighboring an upper boundary of the left partition 142, a data unit 145 neighboring a left boundary of the left partition 142, and a data unit 146 neighboring an upper right corner of the left partition 142.

Although the right partition 153 contacts the left partition 142 at a left boundary, since the left partition 142 and the right partition 143 are partitions of the same prediction unit 141, merging may not be performed between the left partition 142 and the right partition 143. Accordingly, neighboring data unit candidates that may be merged with the right partition 143 may be a data unit 146 neighboring an upper boundary of the right partition 143 and a data unit 147 neighboring an upper right corner of the right partition 143.

Also, merging index information for the right partition 143 may not include an index indicating an upper left neighboring data unit.

Figure 15:
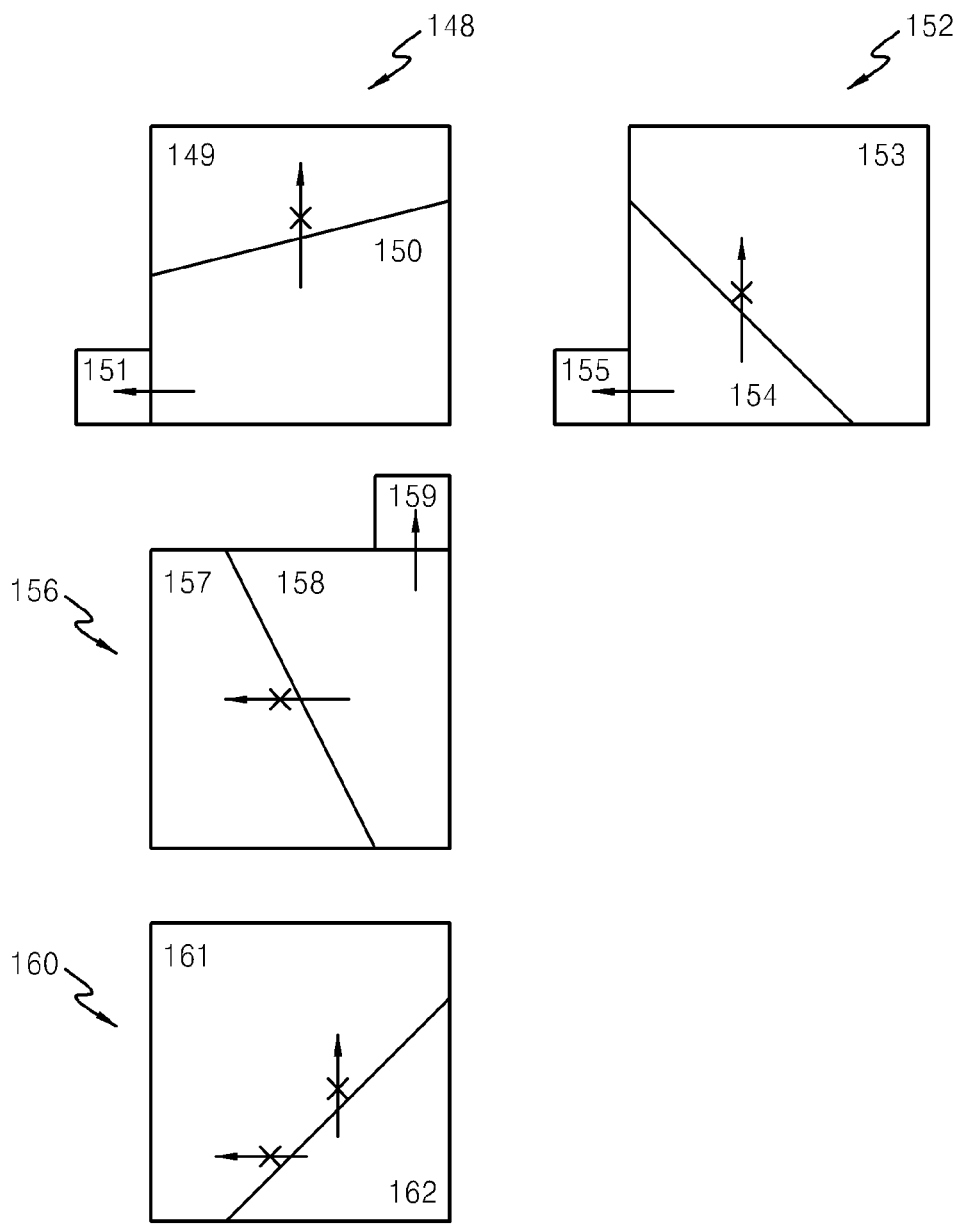
FIG. 15 is a diagram illustrating neighboring data units that may not be merged with a current partition that is a partition having a geometric shape, according to an exemplary embodiment.

FIG. 15 is a diagram illustrating neighboring data units that may not be merged with a current partition that is a partition having a geometric shape, according to an exemplary embodiment.

In prediction encoding of the apparatus 10, a prediction unit may be split not only in a vertical or horizontal direction, and but also in an arbitrary direction into partitions having geometrically various shapes. Prediction units 148, 152, 156, and 160 obtained by performing splitting in arbitrary directions are illustrated in FIG. 15.

Partitions having geometric shapes may not be merged with neighboring data units contacting upper boundaries and left boundaries of the partitions according to positions and shapes of the partitions. For example, from among two partitions 149 and 150 of the prediction unit 148, the partition 150 may be merged with a neighboring data unit 151 contacting a left boundary. However, since a neighboring data unit contacting an upper boundary is the partition 149 included in the same prediction unit 158, the partition 150 may not be merged with the upper neighboring data unit. In this case, merging index information of the partition 150 may not include an index indicating the partition 149 that is the upper neighboring data unit.

Likewise, from among two partitions 153 and 154 of the prediction unit 152, the partition 164 may be merged with a left neighboring data unit 155. However, since an upper neighboring data unit is the partition 153 included in the same prediction unit 152, the partition 154 may not be merged with the upper neighboring data unit.

Likewise, from among two partitions 157 and 158 of the prediction unit 156, the partition 158 may be merged with an upper neighboring data unit 159. However, since a left neighboring data unit is the partition 157 included in the same prediction unit 156, the partition 158 may not be merged with the left neighboring data unit.

Likewise, from among two partitions 161 and 162 of the prediction unit 160, since the partition 161 included in the same prediction unit 160 is an upper neighboring data unit and a left neighboring data unit of the partition 162, the partition 162 may not be merged with the upper neighboring data unit and the left neighboring data unit.

As described with reference to FIGS. 13, 14, and 15, if a neighboring data unit that may not be merged is generated according to a shape or a position of a data unit, merging index information may not include an index indicating the neighboring data unit that may not be merged.

Also, the apparatus 10 may not perform data unit merging to extend a current data unit and to overlap the current data unit with another data unit that exists previously.

For example, if one prediction unit is split into two partitions and a predetermined candidate data unit of the second partition has the same motion information as the first partition, merging between the second partition and the predetermined candidate data unit may not be allowed.

For example, from among the first partition 132 and the second partition 133 of the first prediction unit 131 of FIG. 13, if an upper prediction unit of the second partition 133 has the same motion information as the first partition 132, upper prediction units of the first partition 132 and the second partition 133 may be excluded from a candidate data unit group of the second partition 133. This is because if data unit merging is performed such that the second partition 133 refers to motion information of an upper prediction unit, it is the same as a case where motion information of the first partition 132 is referred to.

Merging information along with whether data unit merging is performed may be set through context modeling considering a prediction mode and a partition type of a neighboring data unit. An index of a context model may be expressed as merging information by analyzing a combination of a prediction mode and a partition type of a neighboring data unit of a current data unit and a case where the current data unit and the neighboring data unit are merged with each other as a context model.

Table 1 shows merging information through context modeling according to an exemplary embodiment. For convenience of explanation, objects to be merged with a current data unit are limited to a left neighboring data unit and an upper neighboring data unit.

TABLE 1

| Left/upper neighboring data unit | Context model index according to partition type | | |
|---|---|---|---|
| | 2N × 2N | 2N × N, 2N × U, 2N × nD | N × 2N, nL × 2N, nR × 2L |
| For both, INTRA mode | | 0 | |
| For only one, merging_flag = 1 | 1 | 3 | 5 |
| For both, merging_flag = 1 | 2 | 4 | 6 |
| For at least one, SKIP mode or DIRECT mode | 7 | 8 | 9 |

There may be selectively included partitions having arbitrary shapes such as symmetrical partition types 2N×2N, 2N×N, N×2N, and N×N obtained by splitting a height or a width of a prediction unit according to a symmetrical ratio, asymmetrical partition types 2N×nU, 2N×nD, nL×2N, and nR×2N obtained by splitting a height or a width of a prediction unit according to an asymmetrical ratio such as 1:n or n:1, or geometric partition types obtained by splitting a height or a width of a prediction unit into various geometrical shapes. The asymmetrical partition types 2N×nU and 2N×nD are obtained by splitting a height of a prediction unit according to ratios of 1:3 and 3:1, respectively, and the asymmetrical partition types nL×2N and nR×2N are obtained by splitting a width of a prediction unit according to ratios of 1:3 and 3:1, respectively.

According to Table 1, since data unit merging is not performed when prediction modes of both a left neighboring data unit and an upper neighboring data unit of a current data unit are intra modes, merging information of the current data unit is assigned to an index 0 without a need to distinguish context models according to partition types.

Also, assuming that prediction modes of a left neighboring data unit and an upper neighboring data unit are inter modes, not skip modes or direct modes, when only one of the left neighboring data unit and the upper neighboring data unit is merged with a current data unit, and when both the left neighboring data unit and the upper neighboring data unit are merged with the current data unit, a context model of merging information may be set according to a combination of whether data unit merging is performed according to partition types of neighboring data units. In this case, each merging information may be assigned to one of context model indices 1 through 6 according to Table 1.

Also, assuming that prediction modes are a skip mode and a direct mode, when at least one of a left neighboring data unit and an upper neighboring data unit is a skip mode or a direct mode, a context mode of merging information may be set according to partition types of neighboring data units and each merging information may be assigned to one of context model indices 7 through 9 according to Table 1.

Accordingly, the apparatus 20 may read merging information according to context modeling, and may analyze whether merging is performed between a current data unit and a neighboring data unit and a prediction mode and a partition type of the neighboring data unit.

The apparatus 20 may infer motion information of a current data unit by using motion information of a neighboring data unit that is merged with the current data unit.

In addition, the apparatus 10 and the apparatus 20 may perform transformation on a merged data unit if a shape of the merged data unit formed by data unit merging is a regular square.

Also, in the apparatus 10 and the apparatus 20, a neighboring data unit merged with a current data unit may share information about an intra prediction direction. Information about a prediction direction for a merged data unit formed by data unit merging may not be encoded or decoded according to data units, but may be encoded or decoded only once for the merged data unit.

Figure 16:
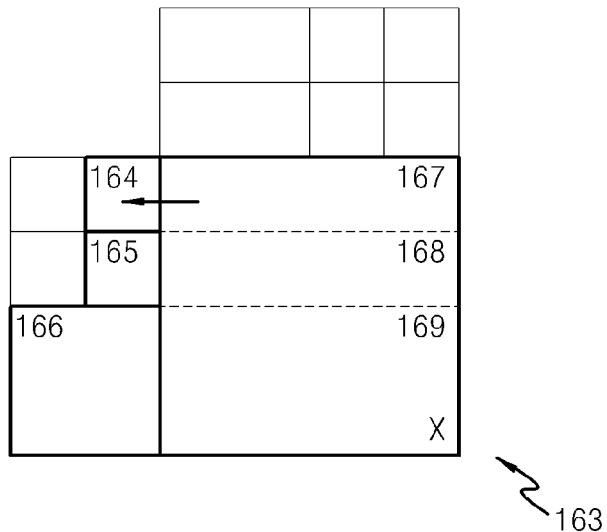
FIG. 16 is a diagram illustrating an example where a neighboring data unit determined to be merged with a current data unit is used, according to an exemplary embodiment.

FIG. 16 is a diagram illustrating an example where a neighboring data unit determined to be merged with a current data unit is used, according to an exemplary embodiment.

The apparatus 10 and the apparatus 20 may extend a boundary of a neighboring data unit to be merged with a current data unit 163, and may use the extended boundary to split a partition of the current data unit 164. For example, if the current data unit 163 is merged with left neighboring data units 164, 165, and 166, boundaries of the left neighboring data units 164, 165, and 166 may be extended to reach the current data unit 163. The current data unit 163 may be split into partitions 167, 168, and 169 according to the extended boundaries of the left neighboring data units 165, 165, and 166.

Figure 17:
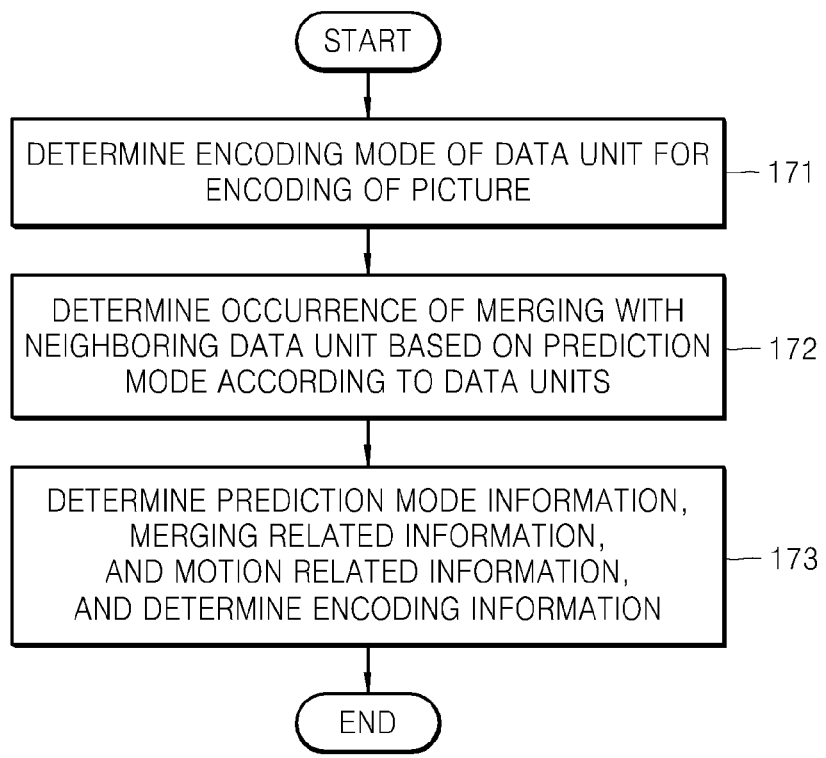
FIG. 17 is a flowchart illustrating a method of encoding a video by using data unit merging, according to an exemplary embodiment.

FIG. 17 is a flowchart illustrating a method of encoding a video by using data unit merging, according to an exemplary embodiment.

In operation 171, an encoding mode indicating a data unit for encoding of a picture and an encoding method including prediction encoding performed for each data unit is determined.

In operation 172, an occurrence of merging with at least one neighboring data unit is determined based on at least one of a prediction mode and the encoding mode according to data units. A data unit may include a prediction unit for prediction encoding and a partition for accurate prediction encoding of the prediction unit.

From among a plurality of upper neighboring data units contacting an upper boundary and a plurality of left neighboring data units contacting a left boundary of a current data unit, a data unit to be merged with the current data unit may be searched for. Also, from among neighboring data units contacting an upper left corner, an upper right upper corner, and a lower left corner of the current data unit, a data unit to be merged with the current data unit may be searched for.

In operation 173, prediction mode information, merging related information, and prediction related information are determined based on the occurrence of merging with the neighboring data unit according to data units, and encoding information including the prediction mode information, the merging related information, and the prediction related information is encoded.

Merging related information of a data unit whose prediction mode is a skip mode and a direct mode may be encoded. Accordingly, merging related information of a data unit which is determined to be merged with a predetermined neighboring data unit may be encoded after skip mode information or direct mode information is encoded. Merging related information may include merging information indicating whether merging is performed between a current data unit and a neighboring data unit, and merging index information indicating the neighboring data unit.

If both skip mode information and merging related information of a prediction unit are encoded, prediction mode information and partition type information of the prediction unit may be encoded after the skip mode information and the merging related information are encoded.

If skip mode information of a prediction unit is encoded and merging related information of a partition is encoded, merging related information may be encoded according to partitions after the skip mode information, prediction mode information, and partition type information of the prediction unit are encoded.

Figure 18:
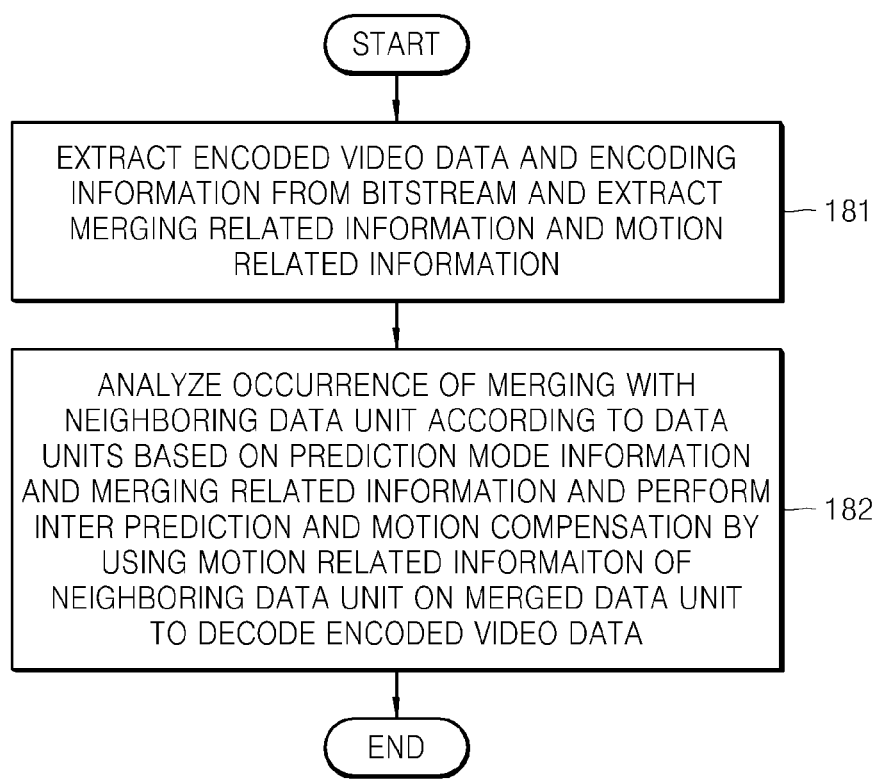
FIG. 18 is a flowchart illustrating a method of decoding a video by using data unit merging according to an exemplary embodiment.

FIG. 18 is a flowchart illustrating a method of decoding a video by using data unit merging, according to an exemplary embodiment.

In operation 181, a received bitstream is parsed, encoded video data and encoding information are extracted from the bitstream, and prediction mode information, merging related information, and prediction related information are extracted from the encoding information.

The merging related information may be extracted based on a result of reading of skip mode information or direct mode information of a current data unit. For example, merging related information of a data unit whose prediction mode is not a skip mode may be extracted. Alternatively, merging related information of a data unit whose prediction mode is an inter mode, not a skip mode and a direct mode may be extracted. Merging information indicating whether merging is performed between a current data unit and a neighboring data unit, and merging index information indicating the neighboring data unit may be read from the merging related information.

If skip mode information and merging related information are extracted for each prediction unit, prediction mode information and partition type information of the prediction unit may be extracted after the skip mode information and the merging related information are extracted.

If skip mode information is extracted at a prediction unit level and merging related information is extracted at a partition level, merging related information may be extracted according to partitions after the skip mode information, the prediction mode information, and the partition type information of the prediction unit are extracted.

In operation 182, an occurrence of merging with at least one neighboring data unit is analyzed based on at least one of a prediction mode and an encoding mode according to data units based on the prediction mode information and the merging related information. Inter prediction and motion compensation are performed on a data unit merged with a neighboring data unit by using prediction related information of the neighboring data unit, and the encoded video data is decoded according to determined data units based on the encoding information.

From among a plurality of upper neighboring data units contacting an upper boundary and a plurality of left neighboring data units contacting a left boundary, a data unit to be merged with a current data unit may be determined based on merging information and merging index information. Also, from among neighboring data units contacting an upper left corner, an upper right corner, and a lower left corner of the current data unit, a data unit to be merged with the current data unit may be determined.

Motion related information of a current data unit may be reconstructed by using motion related information of a data unit merged with the current data unit. The current data unit may be restored and a picture may be restored through motion compensation performed on the current data unit by using the motion related information.

An apparatus and method of encoding a video and an apparatus and method of decoding a video by using data unit merging based on coding units having a tree structure according to one or more exemplary embodiments will now be explained with reference to FIGS. 19 through 33.

Figure 19:
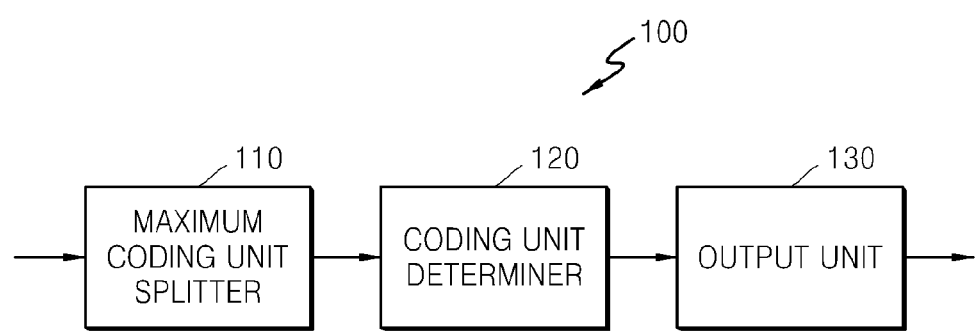
FIG. 19 is a block diagram of an apparatus for encoding a video by using data unit merging based on coding units having a tree structure, according to an exemplary embodiment.

FIG. 19 is a block diagram of an apparatus 100 for encoding a video by using data unit merging based on coding units having a tree structure, according to an exemplary embodiment.

The apparatus 100 includes a maximum coding unit splitter 110, a coding unit determiner 120, and an output unit 130. For convenience of explanation, the apparatus 100 for encoding a video by using data unit merging based on coding units having a tree structure is referred to as 'the apparatus 100 for encoding a video'.

The maximum coding unit splitter 110 may split a current picture based on a maximum coding unit for a current picture of an image. If the current picture is larger than the maximum coding unit, image data of the current picture may be split into at least one maximum coding unit. The maximum coding unit may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit may be characterized by a maximum size and a depth. The depth denotes a number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth are finally output. Also, the coding units corresponding to the coded depth may be regarded as encoded coding units. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units corresponding to same depth in one maximum coding unit, each of the coding units corresponding to the same depth may be split to a lower depth by measuring an encoding error of the image data of the each coding unit, separately. Accordingly, even when image data is included in one maximum coding unit, the image data is split to regions according to the depths, the encoding errors may differ according to regions in the one maximum coding unite, and thus the coded depths may differ according to regions in the image data. Thus, one or more coded depths may be determined in one maximum coding unit, and the image data of the maximum coding unit may be split according to coding units of at least one coded depth.

Accordingly, the coding unit determiner 120 may determine coding units having a tree structure included in the maximum coding unit. The 'coding units having a tree structure' include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth is an index related to the number of splitting times from a maximum coding unit to a minimum coding unit. A first maximum depth may denote the total number of splitting times from the maximum coding unit to the minimum coding unit. A second maximum depth may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation performed to encode a video may include frequency transformation, orthogonal transformation, integer transformation, and so on.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The apparatus 100 may also perform the transformation on the image data in a coding unit based not only on the coding unit for encoding the image data, but also based on a data unit that is different from the coding unit.

In order to perform the transformation in the coding unit, the transformation may be performed based on a transformation unit having a size smaller than or equal to the coding unit. For example, the transformation unit may include a data unit for an intra mode and a transformation unit for an inter mode.

Similarly to coding units having a tree structure, the transformation unit in the coding unit may be recursively split into smaller sized regions, so that the transformation unit may be determined independently in units of regions. Thus, residual data in the coding unit may be split according to the transformation having the tree structure according to transformation depths.

A data unit used as a base of the transformation will now be referred to as a 'transformation unit'. A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into 4^1 transformation units, and the size of the transformation unit is thus N×N, and may be 2 when each of the height and width of the current coding unit is split into four equal parts, totally split into 4^2 transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units having a tree structure in a maximum coding unit and a method of determining a partition, according to exemplary embodiments, will be described in detail later with reference to FIGS. 21 through 31.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the apparatus 100, the deeper coding unit may be a coding unit obtained by splitting a height or width of a coding unit of an upper depth by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

The apparatus 100 ma additionally perform a data unit merging method in order to share prediction related information between data units adjacent to one another and having similar prediction related information. The coding unit determiner 120 of the apparatus 100 may include the coding unit determiner 11 and the data merging determiner 13 of the apparatus 10, and the output unit 130 of the apparatus 100 may include the encoding information determiner 15 of the apparatus 10.

Accordingly, the coding unit determiner 120 of the apparatus 100 may determine whether data unit merging between neighboring data units is performed on coding units, prediction units, and partitions having a tree structure, and the output unit 130 may perform encoding including merging related information in encoding information about a coding unit.

The output unit 130 may insert the merging related information with the encoding information about a coding unit and the information about a maximum size of a coding unit of a current picture, into a header about the current picture, PPS or SPS.

The coding unit determiner 120 may analyze a possibility of data unit merging for sharing prediction related information with a neighboring data unit even if a prediction mode of a current prediction unit or a current partition of coding units having a tree structure is a skip mode or a direct mode.

The coding unit determiner 120 may include all of a plurality of left neighboring data units neighboring a left boundary of a current prediction unit or a current partition and all of a plurality of upper neighboring data units neighboring an upper boundary in a candidate group of neighboring data units to be merged with the current data unit or the current partition.

A lower left neighboring data unit neighboring a lower left corner of the current prediction unit or the current partition may also be referred to according to a scanning order or a decoding order based on the coding units having the tree structure. Accordingly, the coding unit determiner 120 may further include data units neighboring an upper left corner, an upper right corner, and a lower left corner in addition to all of a plurality of the left neighboring data units and the upper neighboring data units in the merging candidate group of the current prediction unit or the current partition.

Also, since a possibility of data unit merging is determined based on a prediction mode of the current prediction unit or the current partition, encodings of prediction mode information and merging information are closely related. For example, the output unit 130 may encode encoding information such that merging related information is set based on skip information or direction information for the current prediction unit or the current partition of the coding units having the tree structure.

Since coding units having a tree structure constituted by the apparatus 100 include prediction units and partitions having various prediction modes and various shapes, prediction units or partitions having various prediction modes and various shapes may contact an upper boundary and a left boundary of the current prediction unit or the current partition. The coding unit determiner 120 may search for a possibility that data unit merging is performed between a current data unit and a plurality of various neighboring prediction units or neighboring partitions contacting an upper boundary and a left boundary of the current prediction unit or the current partition and may determine an object to be merged.

Accordingly, since a current prediction unit or a current partition shares prediction related information with neighboring data units having various sizes, shapes, and positions based on coding units having a tree structure, redundant data may be removed by using peripheral information in a wider range, and video encoding efficiency may be improved.

Figure 20:
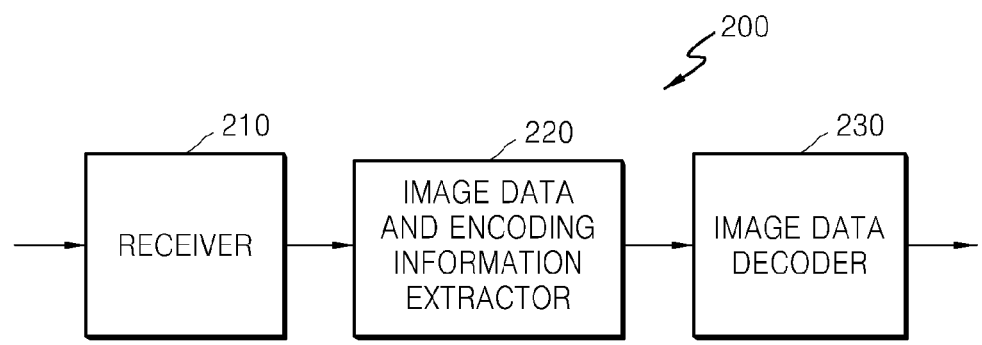
FIG. 20 is a block diagram of an apparatus for decoding a video by using data unit merging based on coding units having a tree structure, according to an exemplary embodiment.

FIG. 20 is a block diagram of an apparatus 200 for decoding a video by using data unit merging based on coding units having a tree structure according to an exemplary embodiment.

The apparatus 200 includes a receiver 210, an image data and encoding information extractor 220, and an image data decoder 230. For convenience of explanation, the apparatus 200 for decoding a video by using data unit merging based on coding units having a tree structure is referred to as 'the apparatus 200 for decoding a video'.

Definitions of various terms, such as a coding unit, a depth, a prediction unit, a transformation unit, and information about various encoding modes, for various operations of the apparatus 200 are identical to those described with reference to FIG. 19 and the apparatus 100.

The receiver 210 receives and parses a bitstream of an encoded video. The image data and encoding information extractor 220 extracts encoded image data for each coding unit from the parsed bitstream, wherein the coding units have a tree structure according to maximum coding units, and outputs the extracted image data to the image data decoder 230. The image data and encoding information extractor 220 may extract information about a maximum size of a coding unit of a current picture, from a header about the current picture, PPS or SPS.

Also, the image data and encoding information extractor 220 extracts information about a coded depth and an encoding mode for the coding units having a tree structure according to maximum coding units, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, encoding information about a coded depth and an encoding mode may further include merging related information about a current prediction unit or a current partition.

The information about the coded depth and the encoding mode according to maximum coding units extracted by the image data and encoding information extractor 220 is information about a coded depth and an encoding mode determined to generate a minimum encoding error when an encoder, such as the apparatus 100, repeatedly performs encoding for each deeper coding unit according to depths according to maximum coding units. Accordingly, the apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, in order to perform inverse transformation according to maximum coding units, the image data decoder 230 may perform inverse transformation based on a transformation unit for every coding unit by reading transformation units having a tree structure including information about sizes of the transformation units of coding units according to coded depths.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

Also, the apparatus 200 may restore a current prediction unit or a current partition by using prediction related information of a peripheral data unit of the current prediction unit or the current partition by using a data unit merging method. To this end, the receiver 210 and the image data and encoding information extractor 220 of the apparatus 200 may include the parser/extractor 21 of the apparatus 20, and the image data decoder 230 of the apparatus 200 may include the data unit merging determiner 23 of the apparatus 20.

The image data and encoding information extractor 220 may extract prediction mode information and merging related information from information about an encoding mode. The image data and encoding information extractor 220 may determine a possibility of extracting and reading the merging related information according to the prediction mode information in information about an encoding mode based on a close relationship between the prediction mode information and the merging related information. For example, the image data and encoding information extractor 220 may extract the merging related information based on skip mode information or direct information for a current prediction unit or a current partition of coding units having a tree structure. Also, merging information and merging index information may be extracted as the merging related information.

The image data decoder 230 of the apparatus 200 may form coding units having a tree structure based on information about an encoding mode and a coded depth, and each coding unit from among the coding units having the tree structure includes prediction units and partitions having various prediction modes and various shapes.

The image data decoder 230 of the apparatus 200 may search for whether merging may be performed between a current data unit and various neighboring prediction units or neighboring partitions contacting an upper boundary and a left boundary of a current prediction unit or a current partition and may determine an object to be merged. Prediction related information of the current prediction unit or the current partition may bed determined or inferred by referring to prediction related information of the merged neighboring prediction unit or partition.

The apparatus 200 may obtain encoding information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Data encoded by sharing prediction related information of neighboring data units having various sizes and shapes based on coding units according to a tree structure may be accurately decoded by referring to prediction related information of a neighboring data unit based on prediction related information and merging related information set based on a close relationship.

A method of determining coding units having a tree structure, a prediction unit, and a transformation unit according to an exemplary embodiment will now be described with reference to FIGS. 21 through 31.

Figure 21:
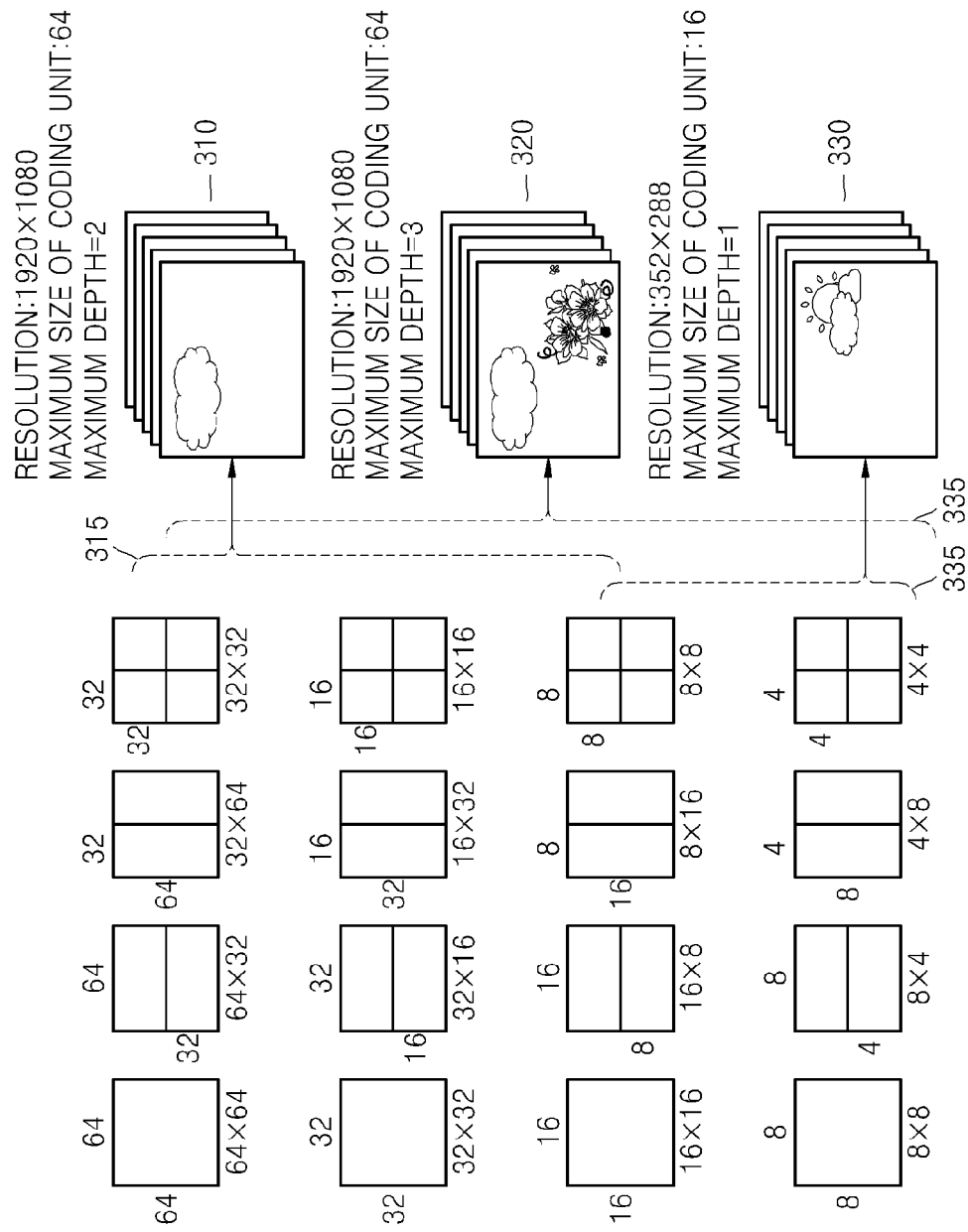
FIG. 21 is a diagram for explaining a concept of coding units, according to an exemplary embodiment.

FIG. 21 is a diagram for explaining a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 11 denotes a total number of splits from a maximum coding unit to a minimum coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 22:
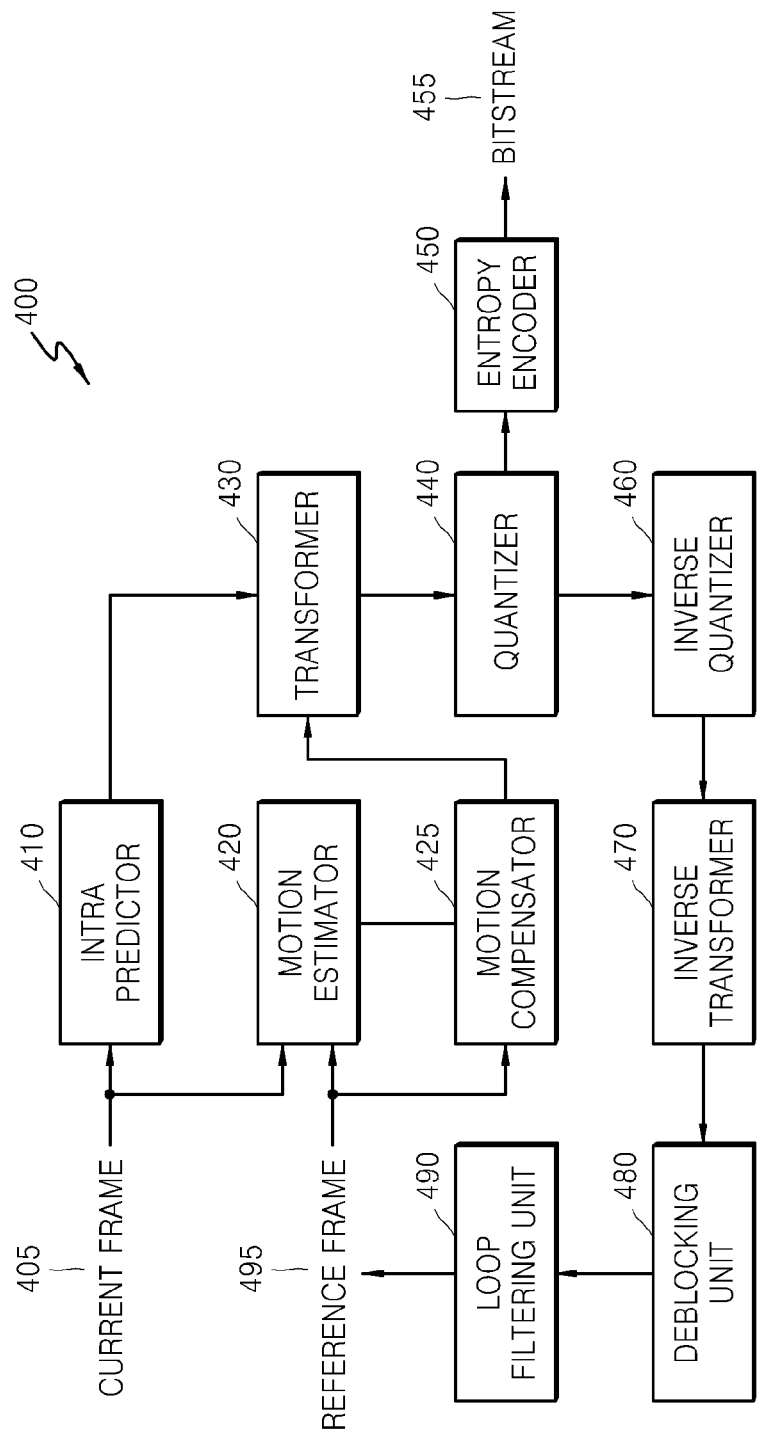
FIG. 22 is a block diagram of an image coding unit based on coding units, according to an exemplary embodiment.

FIG. 22 is a block diagram of an image encoder 400 based on coding units, according to an exemplary embodiment.

The image encoder 400 performs operations of the coding unit determiner 120 of the apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 23:
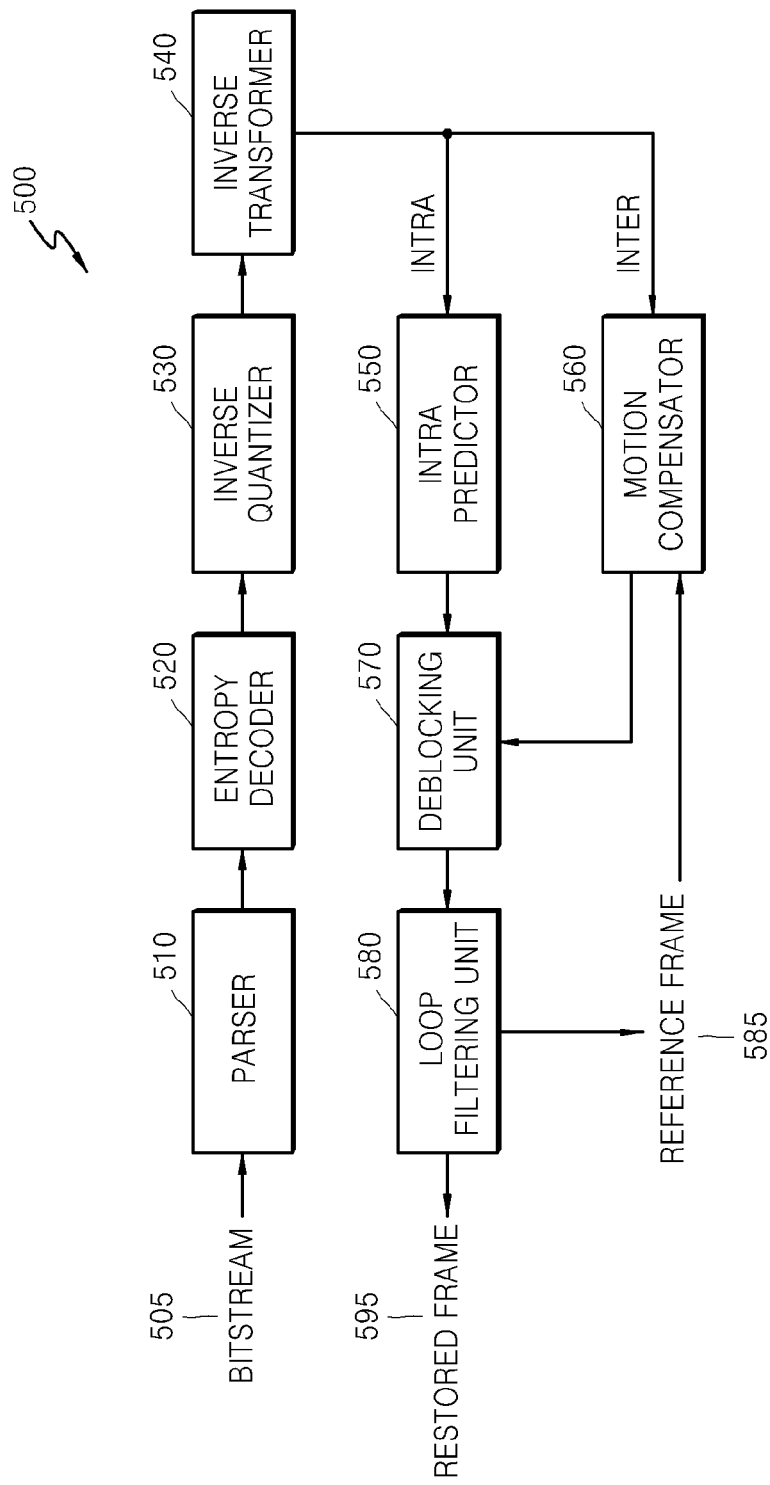
FIG. 23 is a block diagram of an image decoder based on coding units, according to an exemplary embodiment.

FIG. 23 is a block diagram of an image decoder 500 based on coding units according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the apparatus 200, the image decoder 500 may perform operations that are performed after the parser 510.

In order for the image decoder 500 to be applied in the apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 24:
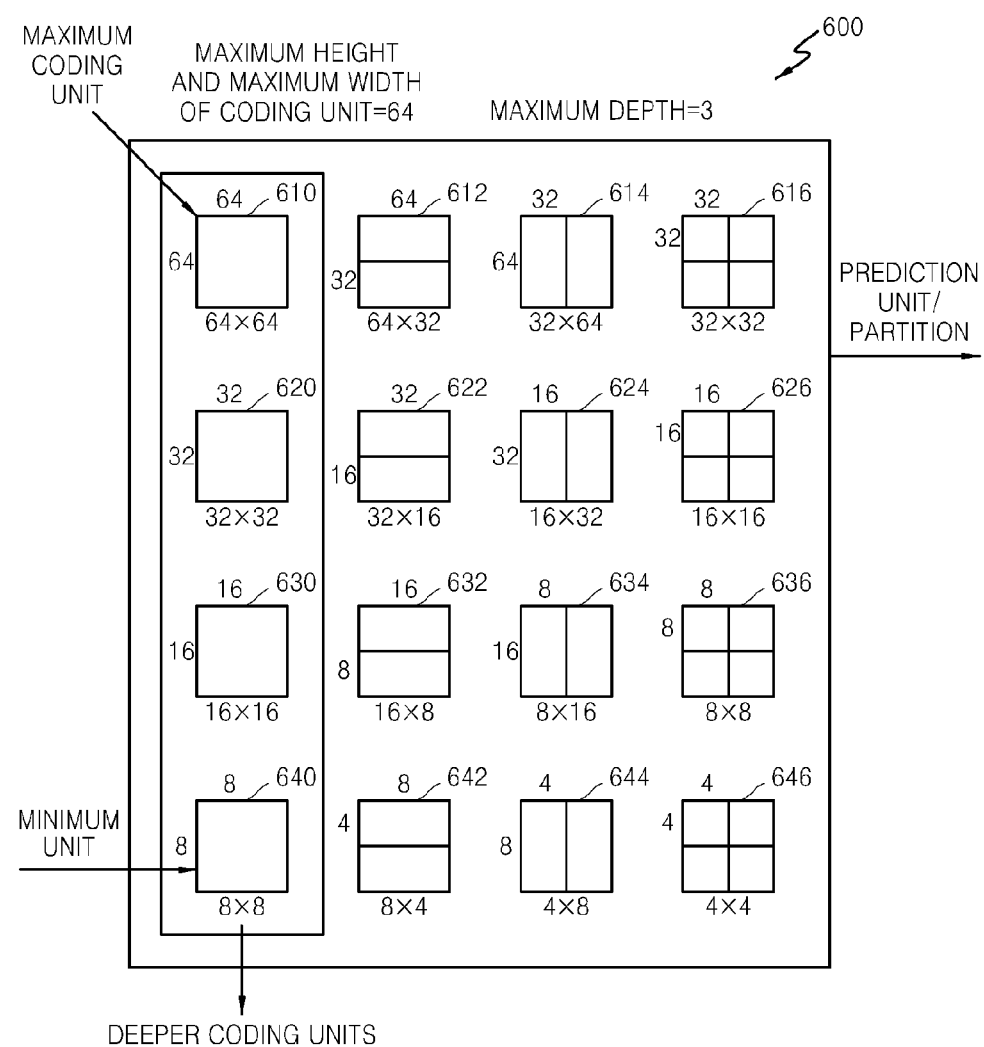
FIG. 24 is a diagram illustrating coding units according to depths and partitions, according to an exemplary embodiment.

FIG. 24 is a diagram illustrating deeper coding units according to depths, and partitions according to an exemplary embodiment.

The apparatus 100 and the apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. In this case, a maximum depth denotes a total number of splits from a maximum coding unit to a minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 exist. The coding unit 640 having the size of 8×8 and the depth of 3 is a minimum coding unit.

The prediction unit and the partitions of a coding unit are arranged along the horizontal axis according to depths. In other words, if the coding unit 610 having the size of 64×64 and the depth of 0 is a prediction unit, the prediction unit may be split into partitions include in the coding unit 610, i.e., a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e., a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depth, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 25 is a diagram for explaining a relationship between a coding unit 710 and transformation units 720 according to an exemplary embodiment.

The apparatus 100 or 200 encodes or decodes an image according to coding units having sizes smaller than or equal to a maximum coding unit for each maximum coding unit. Sizes of transformation units for transformation during encoding may be selected based on data units that are not larger than corresponding coding unit.

For example, in the apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 26 is a diagram for explaining encoding information of coding units corresponding to a coded depth according to an exemplary embodiment.

The output unit 130 of the apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the apparatus 200 may extract and use the information 800, 810, and 820 for decoding.

Although not shown in FIG. 26, information about an encoding mode may include merging related information, and the merging related information may be set based on the information 810 about the prediction mode such as an inter mode, an intra mode, a skip mode, or a direct mode. For example, if the information 810 about the prediction mode is information about a skip mode, merging related information may be selectively set. Only when the information 810 about the prediction mode is information about an inter mode, not a skip mode and a direct mode, merging related information may be set.

Figure 27:
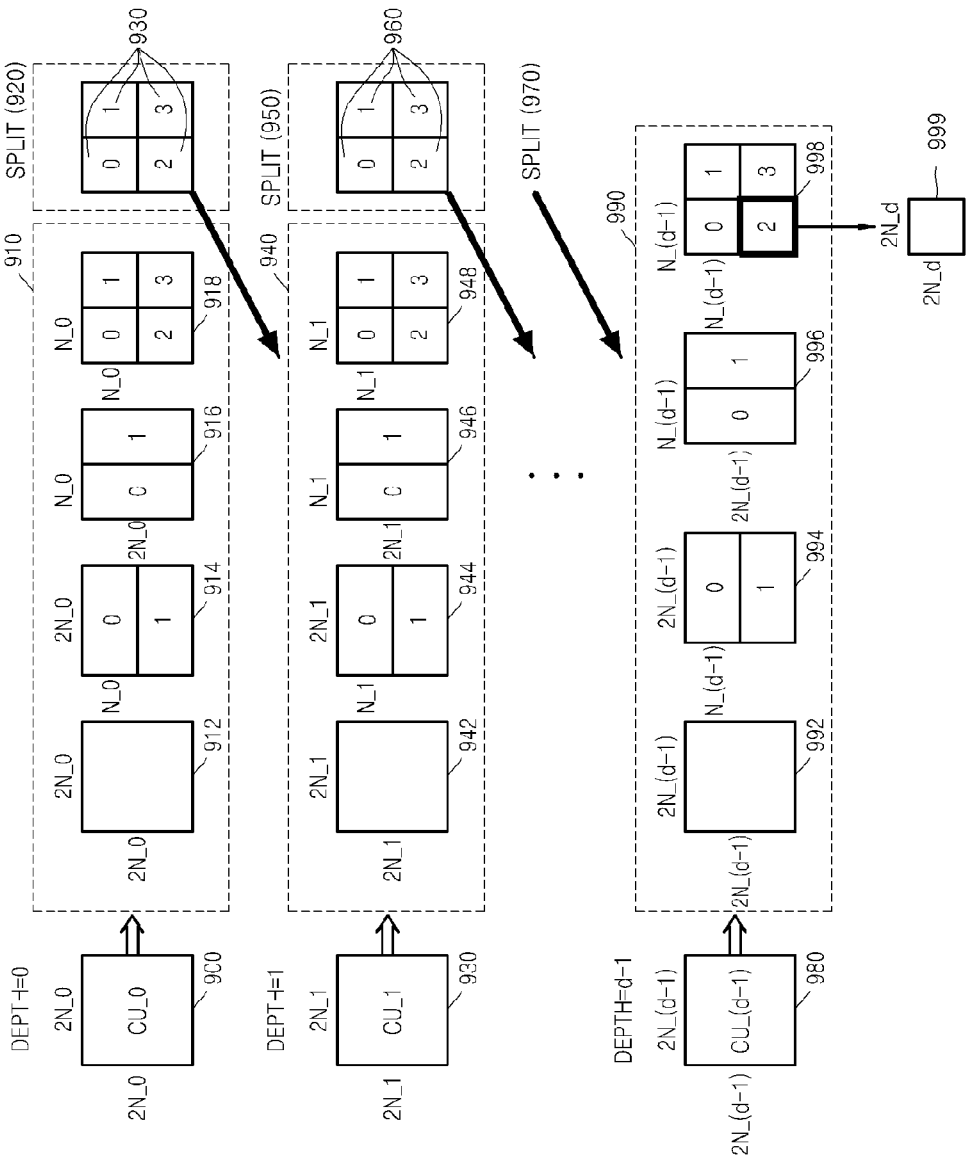
FIG. 27 is a diagram illustrating coding units according to depths, according to an exemplary embodiment.

FIG. 27 is a diagram illustrating deeper coding units according to depths according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0× N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to partition types. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0× 2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 1 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d−1, split operation according to depths may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d−1, a coding unit CU_(d−1) having a depth of d−1 is no longer split to a lower depth, and a coded depth for the coding units constituting a current maximum coding unit 900 is determined to be d−1 and a partition type of the coding unit 900 may be determined to be N_(d−1)×N_(d−1). Also, since the maximum depth is d−1 and a minimum coding unit 980 having a lowermost depth of d−1 is no longer split to a lower depth, split information for a coding unit 980 is not set.

A data unit 999 may be a 'minimum unit' for the current maximum coding unit. A minimum unit may be a rectangular data unit obtained by splitting a minimum coding unit 980 by 4. By performing the encoding repeatedly, the apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the apparatus 200 may extract and use the information about the coded depth and the prediction unit of the coding unit 900 to decode the partition 912. The apparatus 200 may determine a depth, in which split information is 0, as a coded depth by using split information according to depths, and use information about an encoding mode of the corresponding depth for decoding.

Figure 28:
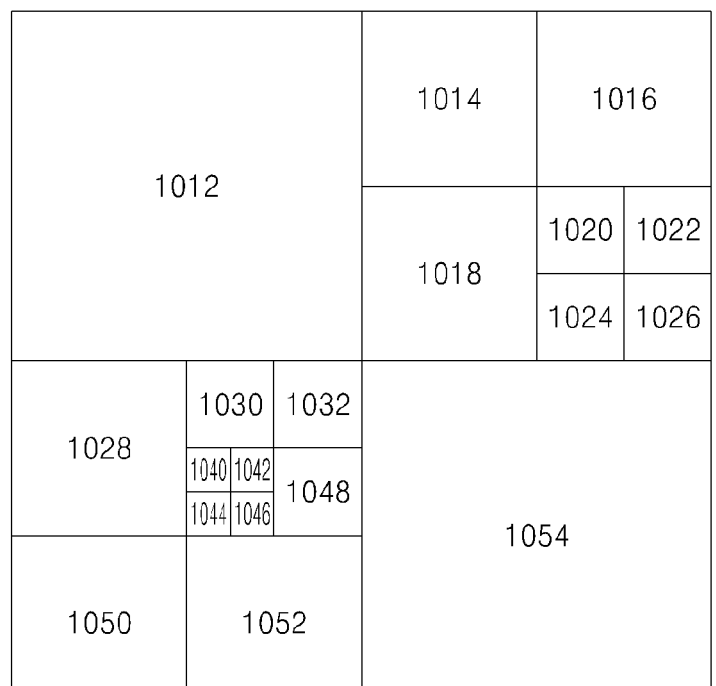
FIGS. 28 through 30 are diagrams for explaining a relationship between coding units, prediction units, and transformation units, according to an exemplary embodiment.
Figure 29:
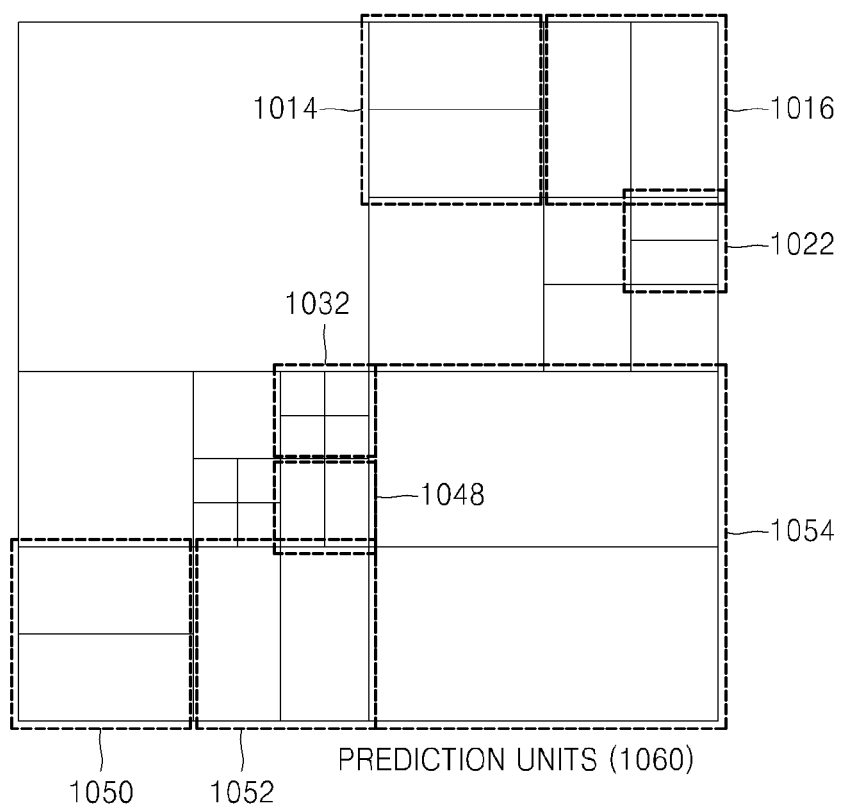
Figure 30:
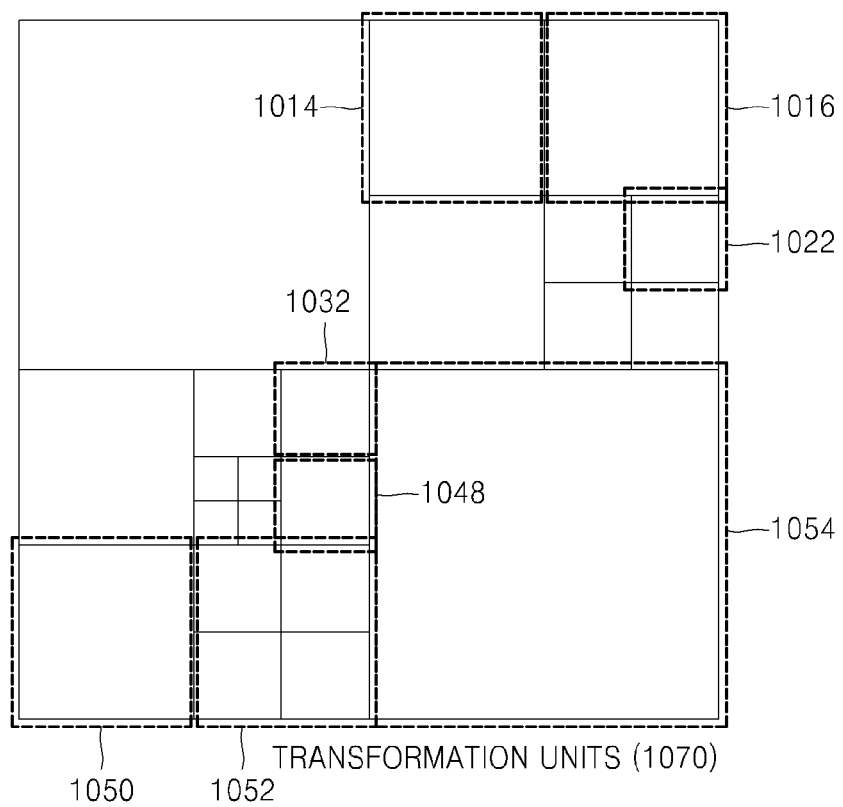

FIGS. 28 through 30 are diagrams for explaining a relationship between coding units 1010, prediction units 1060, and transformation units 1070 according to an exemplary embodiment.

The coding units 1010 are coding units having a tree structure, corresponding to coded depths determined by the apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are split into partitions for prediction encoding. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 2 shows the encoding information that may be set by the apparatuses 100 and 200.

TABLE 2

| Split Information 0 (Encoding on Coding unit having Size of 2N × 2N and Current Depth of d) | | | | | Split Information 1 |
| --- | --- | --- | --- | --- | --- |
| Prediction Mode | Partition Type | | Size of Transformation Unit | | Repeatedly Encode |
| Intra Inter | Symmetrical Partition | Asymmetrical Partition | Split Information 0 of | Split Information 1 of | Coding Units having |

TABLE 2-continued

| Split Information 0 (Encoding on Coding unit having Size of 2N × 2N and Current Depth of d) | | | | | Split Information 1 |
| --- | --- | --- | --- | --- | --- |
| Skip (Only 2N × 2N) | Type | Type | Transformation Unit | Transformation Unit | Lower Depth of d + 1 |
| | 2N × 2N | 2N × nU | 2N × 2N | N × N | |
| | 2N × N | 2N × nD | | (Symmetrical | |
| | N × 2N | nL × 2N | | Type) | |
| | N × N | nR × 2N | | N/2 × N/2 | |
| | | | | (Asymmetrical | |
| | | | | Type) | |

The output unit 130 of the apparatus 100 may output the encoding information about the coding units having a tree structure, and the image data and encoding information extractor 220 of the apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 31:
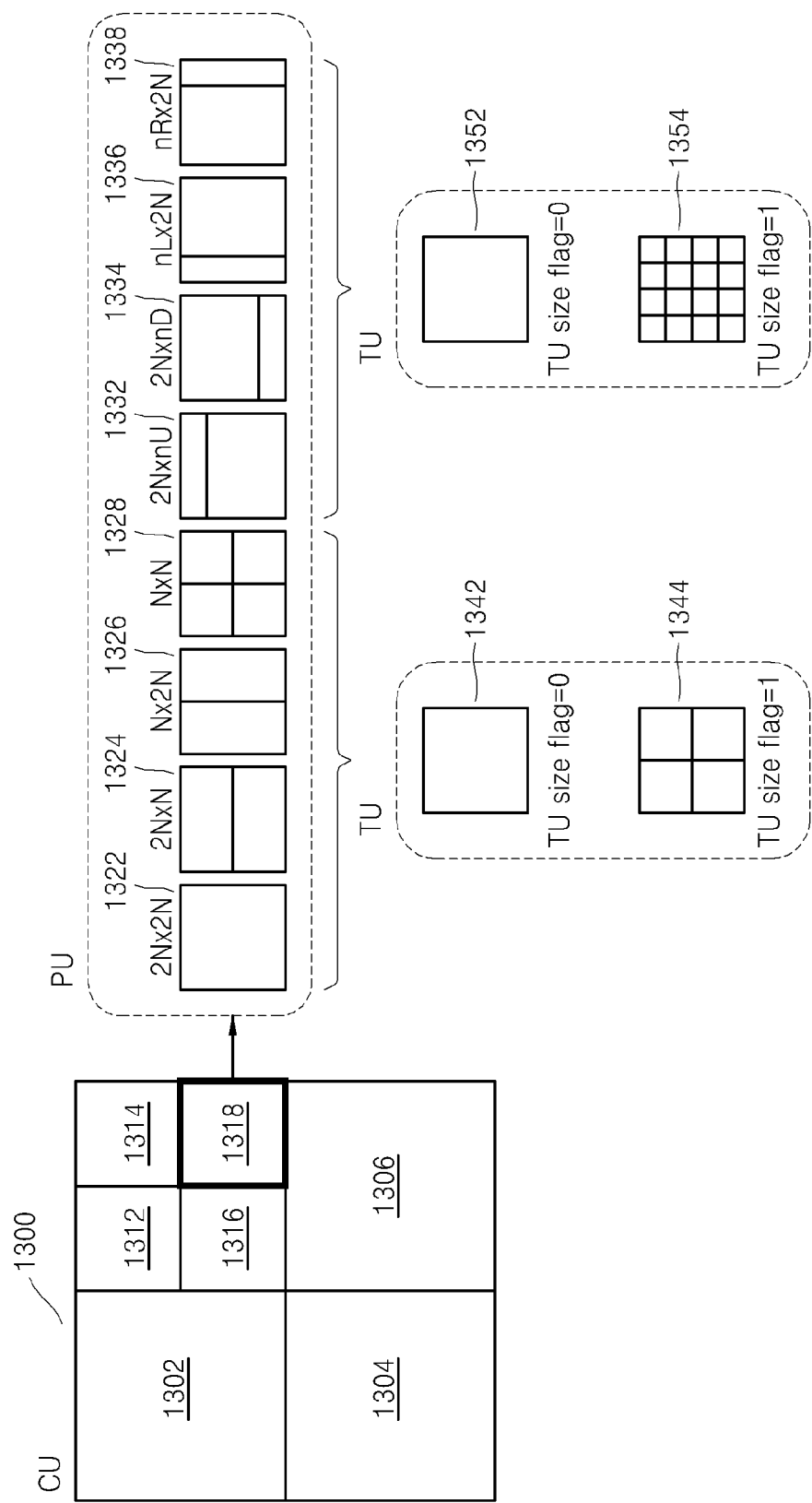
FIG. 31 is a diagram for explaining a relationship between a coding unit, a prediction unit, and a transformation unit, according to encoding mode information of Table 2.

FIG. 31 is a diagram for explaining a relationship between a coding unit, a prediction unit or a partition, and a transformation unit according to encoding mode information of Table 2.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a transformation index, and thus a size of the transformation unit corresponding to the transformation index may vary according to a prediction unit type or a partition type of a coding unit.

For example, when the partition type is set to be symmetrical, i.e., the partition type 1322, 1324, 1326, or 1328, a transformation unit 1342 having a size of 2N×2N is set if a TU size flag is 0, and a transformation unit 1344 having a size of N×N is set if a TU size flag is 1.

On the other hand, when the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 18, the TU size flag is a flag having a value or 0 or 1, but the TU size flag is not limited to 1 bit, and a transformation unit may be hierarchically split having a tree structure while the TU size flag increases from 0. The TU size flag may be used as an example of a transformation index.

In this case, a size of a transformation unit that has been actually used may be expressed by using a TU size flag of a transformation unit together with a maximum size and minimum size of the transformation unit. The apparatus 100 may encode maximum transformation unit size information, minimum transformation unit size information, and a maximum TU size flag. The result of encoding the maximum transformation unit size information, the minimum transformation unit size information, and the maximum TU size flag may be inserted into an SPS. The apparatus 200 may decode a video by using the maximum transformation unit size information, the minimum transformation unit size information, and the maximum TU size flag.

For example, if a size of a current coding unit is 64×64 and a maximum transformation unit size is 32×32, then a size of a transformation unit may be 32×32 when a TU size flag is 0, may be 16×16 when the TU size flag is 1, and may be 8×8 when the TU size flag is 2.

As another example, if a size of a current coding unit is 32×32 and a minimum transformation unit size is 32×32, then a size of a transformation unit may be 32×32 when the TU size flag is 0. Here, the TU size flag may not be set to a value other than 0, since the size of the transformation unit may not be less than 32×32.

As another example, if a size of a current coding unit is 64×64 and a maximum TU size flag is 1, then the TU size flag may be 0 or 1. Here, the TU size flag may not be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that may be determined in a current coding unit, may be defined by Equation (1):

$$CurrMinTuSize=\max(MinTransformSize, RootTuSize/(2^{\wedge}MaxTransformSizeIndex)) \quad (1)$$

Compared to the current minimum transformation unit size 'CurrMinTuSize' that may be determined in the current coding unit, a transformation unit size 'RootTuSize' when the TU size flag is 0 may denote a maximum transformation unit size that may be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that may be determined in the current coding unit.

The maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and is not limited thereto.

Figure 32:
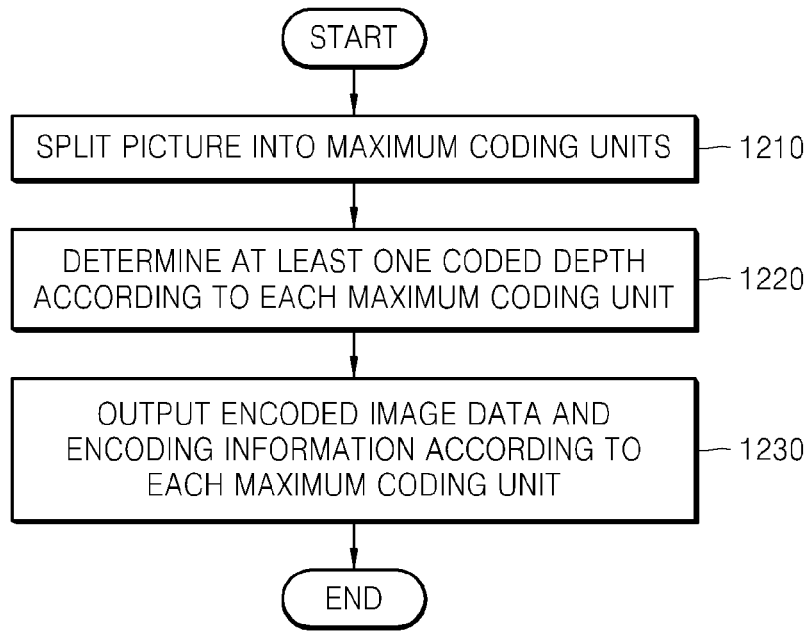
FIG. 32 is a flowchart illustrating a method of encoding a video by using data unit merging based on coding units having a tree structure, according to an exemplary embodiment.

FIG. 32 is a flowchart illustrating a method of encoding a video by using data unit merging based on coding units having a tree structure, according to an exemplary embodiment.

In operation 1210, a current picture of a video is split into maximum coding units. In operation 1220, image data may be encoded as coding units according to depths for every maximum coding unit of the current picture, a depth generating the smallest encoding error may be selected and determined according to a coded depth, and coding units having a tree structure comprised of coding units of the depth determined to be the coded depth may be determined. Image data according to encoded maximum coding units according to the determined coding unit may be output.

In operation 1230, whether data unit merging between neighboring data units is performed on prediction units or partitions of coding units having a tree structure may be determined. Prediction related information may be shared between merged data units. A necessity of data unit merging for sharing prediction related information with a neighboring data unit may be analyzed even though a prediction mode of a current prediction unit or a current partition of coding units having a tree structure is a skip mode or a direct mode.

In operation 1230, information about an encoding mode of the coding units having the tree structure may be encoded to include merging related information including merging information and merging index information. Information about the encoding mode and the image data of the maximum coding unit encoded based on the coding units having the tree structure may be output in bitstreams.

Figure 33:
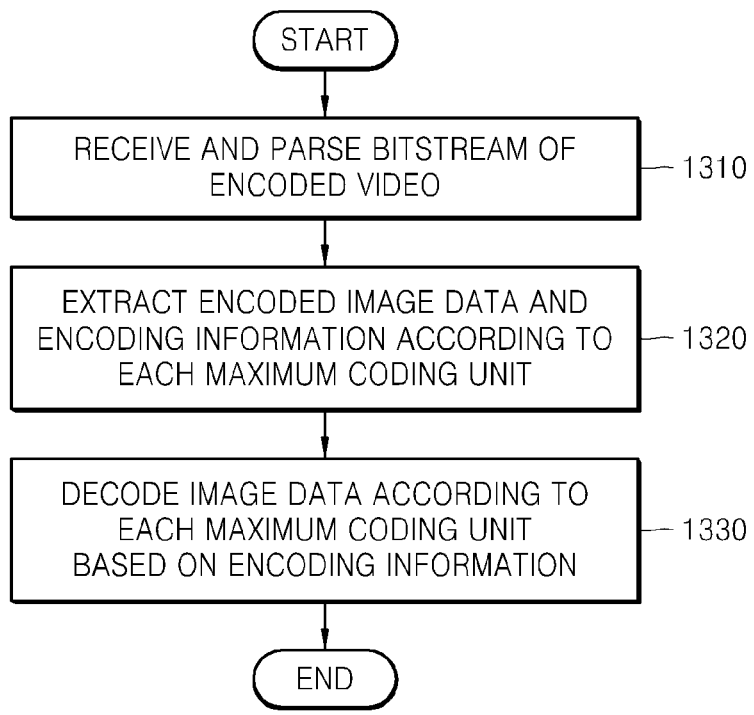
FIG. 33 is a flowchart illustrating a method of decoding a video by using data unit merging based on coding units having a tree structure, according to an exemplary embodiment.

FIG. 33 is a flowchart illustrating a method of decoding a video by using data unit merging based on coding units having a tree structure according to an exemplary embodiment.

In operation 1310, a bitstream of an encoded video is received and parsed. In operation 1320, encoded image data of a current picture image data encoded for every coding unit according to coding units having a tree structure is extracted from the parsed bitstream according to maximum coding units, and information about a coded depth and an encoding mode is extracted.

From the information about the coded depth and the encoding mode, merging related information may be extracted. A possibility of extracting and reading the merging related information may be determined based on prediction mode information. For example, the merging related information may be extracted based on skip mode information or direct information for a current prediction unit or a current partition of the coding units having the tree structure. Also, merging information and merging index information may be extracted as the merging related information.

In operation 1330, information about a partition type, a prediction mode, and a transformation unit of a prediction unit of the coding units having the tree structure may be read based on the information about the encoding mode and the coded depth of the maximum coding unit, and may be used to decode image data of the maximum coding unit.

Also, an object to be merged may be searched for from among a plurality of neighboring data units neighboring a current data unit and data unit merging may be determined based on the merging related information. Motion estimation and compensation of the current prediction unit or a current partition may be performed by inferring prediction related information of the current prediction unit or the current partition by sharing or referring to prediction related information of a merged neighboring prediction unit or partition. Image data of the maximum coding unit may be restored and a current picture may be restored through decoding including motion estimation and compensation according to the coding units having the tree structure.

In the apparatus 100 and the apparatus 200, since a possibility that data unit merging for sharing mutual prediction related information may be performed on prediction modes and partitions having various prediction modes, various sizes and shapes according to a tree structure is examined, merging is performed between neighboring data units having various positions, thereby making it possible to share prediction related information. Accordingly, since redundant data may be removed by using peripheral information in a wider range, efficiency of encoding image data may be improved.

Also, since prediction mode information and merging related information are encoded and decoded hierarchically and continuously in consideration of a close relationship between a possibility of merging and various prediction modes, efficiency of encoding information may be improved.

One or more exemplary embodiments may be written as computer programs and may be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of exemplary embodiments, but by the appended claims, and all differences within the scope will be construed as being included in the present invention.

What is claimed is:

1. A method of decoding a video, the method comprising:
obtaining, from a bitstream, split information for a coding unit;
when the split information indicates a non-split for the coding unit, obtaining, from the bitstream, a skip flag for the coding unit which indicates whether a prediction mode for the coding unit is a skip mode;
when the skip flag indicates the skip mode, obtaining, from the bitstream, a merge index indicating one block among a candidate block group, and determining a motion vector of the coding unit based on a motion vector of the one block indicated by the merge index;
when the skip flag indicates a non-skip mode, obtaining, from the bitstream, a partition type and merge information of a partition, the merge information of the partition indicating whether the partition is decoded in a merge mode; and
performing motion compensation on the partition using motion information of the block which the merge index indicates,
wherein:
the candidate block group includes three or more blocks among neighboring blocks of the coding unit,
the neighboring blocks comprising:
a left-lower block located on a left side of a leftmost block among lower blocks directly below a lower border of a prediction unit in the coding unit, the left-lower block being located below a lowermost block among left blocks adjacent to a left border of the prediction unit,
a left-upper block located on a left side of a leftmost block among upper blocks directly above an upper border of the prediction unit, the left-upper block being located above an uppermost block among the left blocks adjacent to the left border of the prediction unit, and
a right-upper block located on a right side of a rightmost block among the upper blocks directly above the upper border of the prediction unit,
when the partition type is obtained from the bitstream, one or more partitions, including the partition, are determined from the coding unit based on the partition type,
an image is split into a plurality of maximum coding units, according to a maximum size of the coding unit,
a maximum coding unit, of the plurality of maximum coding units, is hierarchically split into one or more coding units of depths including at least one of a current depth and a lower depth, according to the split information,
when the split information indicates a split for the current depth, the coding unit of the current depth is split into four rectangular coding units of a lower depth, independently from neighboring coding units, and
when the split information indicates a non-split of the current depth,
one or more prediction units are obtained from the coding unit of the current depth while the skip flag indicates the non-skip mode, and
one or more transformation units are obtained from the coding unit of the current depth.

2. The method of claim 1, wherein the candidate block group comprises data units that are merging candidates with a current data unit in regions neighboring the current data unit based on merging index information, and
one data unit is determined to be merged with the current data unit from among the data units in the determined candidate block group.

\* \* \* \* \*